US009350689B2

(12) United States Patent
Little et al.

(10) Patent No.: US 9,350,689 B2
(45) Date of Patent: *May 24, 2016

(54) SYSTEMS AND METHODS FOR PROTECTING HEADER FIELDS IN A MESSAGE

(71) Applicant: BLACKBERRY LIMITED, Waterloo (CA)

(72) Inventors: Herbert Anthony Little, Waterloo (CA); Neil Patrick Adams, Waterloo (CA); Michael Stephen Brown, Kitchener (CA)

(73) Assignee: BlackBerry Limited, Waterloo, Ontario (CA)

(*) Notice: Subject to any disclaimer, the term of this patent is extended or adjusted under 35 U.S.C. 154(b) by 348 days.

This patent is subject to a terminal disclaimer.

(21) Appl. No.: 13/923,475

(22) Filed: Jun. 21, 2013

(65) Prior Publication Data

US 2013/0282848 A1    Oct. 24, 2013

Related U.S. Application Data

(63) Continuation of application No. 12/394,766, filed on Feb. 27, 2009, now Pat. No. 8,499,045.

(51) Int. Cl.
*G06F 15/16* (2006.01)
*G06F 15/173* (2006.01)
(Continued)

(52) U.S. Cl.
CPC .............. *H04L 51/04* (2013.01); *H04L 12/58* (2013.01); *H04L 63/20* (2013.01); *H04L 12/4641* (2013.01); *H04L 12/585* (2013.01); *H04L 63/0823* (2013.01); *H04L 63/123* (2013.01)

(58) Field of Classification Search
CPC ....... H04L 9/08; H04L 9/3226; H04L 9/3234; H04L 9/3242; H04L 9/3263; H04L 63/20; H04L 63/045; H04L 63/0823; H04L 63/123; H04L 63/061; H04L 12/58; H04L 12/585; H04L 12/4641
USPC ......... 709/205–207, 217–219, 224–225, 229, 709/231; 726/5, 10–11, 26
See application file for complete search history.

(56) References Cited

U.S. PATENT DOCUMENTS 6,640,301 B1 * 10/2003 Ng ................................. 713/156
6,766,451 B1 *  7/2004 Van Rijnsoever ............. 713/160
(Continued)

FOREIGN PATENT DOCUMENTS

EP          2224655 A1      9/2010
EP          2224656 A1      9/2010
(Continued)

OTHER PUBLICATIONS

Rhode Island Department of Health, "Using Secure Email Encryption Within Groupwise Email", Sep. 20, 2007.
(Continued)

*Primary Examiner* — Farzana Huq
(74) *Attorney, Agent, or Firm* — Integral Intellectual Property Inc.; Miriam Paton; Amy Scouten

(57) ABSTRACT

Embodiments of the systems and methods described herein facilitate the transmitting, receiving, and processing of encoded messages wherein the header fields in the message header are protected. In one embodiment, the contents of the header fields to be protected are inserted into the message body as one or more additional lines of text, for example, prior to encoding and transmitting the message to a message recipient. Upon receipt of the message, the message recipient processes the encoded message such that the contents of the protected header fields can be extracted from the message body. Accordingly, by inserting the contents of the header fields to be protected into the message body, the header fields may be protected using existing standards and protocols for facilitating secure message communication.

21 Claims, 18 Drawing Sheets

(51) Int. Cl.
G06F 17/30 (2006.01)
G06F 7/04 (2006.01)
G06F 9/00 (2006.01)
H04N 7/16 (2011.01)
H04L 12/58 (2006.01)
H04L 12/46 (2006.01)
H04L 29/06 (2006.01)

(56) References Cited

U.S. PATENT DOCUMENTS

| | | | |
|---|---|---|---|
| 7,196,807 B2 | 3/2007 | Goldstone | |
| 7,522,732 B2 | 4/2009 | Whitehead | |
| 8,326,931 B2 | 12/2012 | Brown et al. | |
| 8,379,599 B2 | 2/2013 | Velev et al. | |
| 8,463,863 B2 | 6/2013 | Brown et al. | |
| 2003/0065917 A1 | 4/2003 | Medvinsky et al. | |
| 2003/0204722 A1 | 10/2003 | Schoen et al. | |
| 2003/0231625 A1* | 12/2003 | Calvignac et al. | 370/389 |
| 2004/0249892 A1 | 12/2004 | Barriga et al. | |
| 2005/0081039 A1* | 4/2005 | Lee et al. | 713/176 |
| 2005/0254645 A1* | 11/2005 | Shippy et al. | 380/28 |
| 2006/0031352 A1 | 2/2006 | Marston et al. | |
| 2006/0098663 A1* | 5/2006 | Shore | 370/401 |
| 2006/0168006 A1 | 7/2006 | Shannon et al. | |
| 2006/0168071 A1 | 7/2006 | Sugiura | |
| 2007/0156821 A1 | 7/2007 | Hardy et al. | |
| 2007/0171923 A1 | 7/2007 | Eisner et al. | |
| 2008/0189770 A1 | 8/2008 | Sachtjen | |
| 2008/0209539 A1 | 8/2008 | Padmanabhuni et al. | |
| 2009/0077372 A1* | 3/2009 | Danieli et al. | 713/153 |
| 2010/0223342 A1 | 9/2010 | Brown et al. | |
| 2013/0246547 A1 | 9/2013 | Little et al. | |

FOREIGN PATENT DOCUMENTS

| | | | |
|---|---|---|---|
| WO | 01/75559 A2 | 10/2001 | |
| WO | WO 0175559 A2 * | 10/2001 | |
| WO | 2008120885 A1 | 10/2008 | |
| WO | 2010096921 A1 | 9/2010 | |
| WO | 2010096922 A1 | 9/2010 | |

OTHER PUBLICATIONS

Entrust, Inc., "Entrust Secure E-mail Solution Now Offerse Encrypted Adobe® PDF Capabilites; Entrust Entellegence Messaging Server Extends Delivery Methods, Serves as Comprehensive Communication Platfor", PRNewswire-FirstCall, Dallas, Apr. 8, 2008.
University of Medicine and Dentistry of New Jersey, "HIPAA Secure Email Information/FAQ's", Retrieved from Internet: http://www2.umdnj.edu/hipaaweb/security/security_emailFAQ02.htm [retrieved on Apr. 18, 2008].
Liao, Lijun et al., "Header Protection for S/MIME", Network Working Group: Internet-Draft, The IETF Trust (2007). Retrieved from the Internet: http://tools/ietf.org/html/draft-liao-smimeheaderprotect-01 [retreived on Mar. 17, 2010].
Clipperz, "gmail: Freenigma, email encryption done eright", 2007. Retrieved from the Internet http://www.clipperz.com/tags/gmail.
Written Opinion. Co-pending Application No. PCT/CA2010/000265. Dated Jun. 4, 2010.
United States Office Action. U.S. Appl. No. 12/394,766. Dated: Nov. 10, 2010.
Response to Office Action. U.S. Appl. No. 12/394,766. Dated: Feb. 9, 2011.
International Search Report. Application No. PCT/CA2010/000264. Dated: May 20, 2010.
Written Opinion. Application No. PCT/CA2010/000264. Dated: May 20, 2010.
Final Office Action. U.S. Appl. No. 12/394,766. Dated: Mar. 30, 2011.
Response to Office Action. U.S. Appl. No. 12/394,766. Dated: Jun. 28, 2011.
Extended European Search Report. Co-pending European Patent Application No. 09154059.1. Dated: Jul. 20, 2009.
International Preliminary Report on Patentability. Co-pending Application No. PCT/CA2010/000265. Dated: Aug. 30, 2011.
International Preliminary Report on Patentability. Application No. PCT/CA2010/000264. Dated: Aug. 30, 2011.
Request for Continued Examination (RCE). U.S. Appl. No. 12/394,766. Dated: Jun. 28, 2011.
European Extended Search Report. European Application No. 09154056.7. Dated: Jul. 20, 2009.
Response. European Patent Application No. 09154056.7. Dated: Feb. 23, 2010.
Response. Co-pending European Patent Application No. 09154059.1. Dated: Feb. 23, 2010.
Response to European Examination Report. Co-pending European Patent Application No. 09154059.1. Dated Jul. 1, 2013.
Response to European Examination Report. European Patent Application No. 09154056.7. Dated Jul. 1, 2013.
Office Action. Canadian Application No. 2,753,612. Dated Jun. 3, 2013.
Office Action. Co-pending Canadian Application No. 2,753,613. Dated Jun. 5, 2013.
International Search Report. Co-pending Application No. PCT/CA2010/000265. Dated: Jun. 4, 2010.
European Exam Report. European Patent Application No. 09154056.7. Dated Mar. 14, 2013.
European Exam Report. Co-pending European Patent Application No. 09154059.1. Dated Mar. 14, 2013.
Notice of Allowance. U.S. Appl. No. 12/394,766. Dated Apr. 3, 2013.
Terminal Disclaimer. U.S. Appl. No. 12/394,766. Dated Mar. 14, 2013.
Applicant Interview Summary. U.S. Appl. No. 12/394,766. Dated Apr. 5, 2013.
Previously co-pending U.S. Appl. No. 12/394,809, now issued as U.S. Pat. No. 8,326,931. Prosecution documents.
Previously co-pending U.S. Appl. No. 12/565,229, now issued as U.S. Pat. No. 8,463,863. Prosecution documents.
Notice of Intent to Grant. U.S. Appl. No. 12/394,766. Dated Jul. 10, 2013.
Exam Report. European Patent Application No. 09154056.7. Dated: Apr. 4, 2014.
Response. European Patent Application No. 09154056.7. Dated: Jun. 17, 2014.
Office Action. Canadian Patent Application No. 2,753,612. Dated: May 8, 2014.
Notice of Allowance. Canadian Patent Application No. 2,753,612. Dated: Oct. 24, 2014.
Notice of Abandonment. Canadian Patent Application No. 2,753,612. Dated: Jan. 30, 2014.
Office Action. U.S. Appl. No. 13/889,621. Dated: Apr. 25, 2014.
Amendment. U.S. Appl. No. 13/889,621. Dated: Jul. 24, 2014.
Terminal Disclaimer. U.S. Appl. No. 13/889,621. Dated: Jul. 24, 2014.
Interview Summary. U.S. Appl. No. 13/889,621. Dated: Aug. 11, 2014.
Final Office Action. U.S. Appl. No. 13/889,621. Dated: Aug. 18, 2014.

* cited by examiner

SYSTEMS AND METHODS FOR PROTECTING HEADER FIELDS IN A MESSAGE

CROSS REFERENCE TO RELATED APPLICATION

This application is a continuation of U.S. patent application Ser. No. 12/394,766, filed Feb. 27, 2009. The entire contents of U.S. patent application Ser. No. 12/394,766 are hereby incorporated by reference.

RELEVANT FIELD

Embodiments described herein relate generally to the processing of messages (e.g. electronic mail messages), and more specifically to the processing of encoded messages.

BACKGROUND

An electronic mail ("e-mail") message may comprise one or more of the following: a message header, a message body, optionally one or more encoded attachments, one or more encrypted session keys (e.g. if the message is encrypted), and digital signature and signature-related information. The message header may comprise the following header fields, for example: "To", "From", "Cc", "Bcc", "Date", "Reply-To", and "Subject".

Electronic mail messages may be generally encoded using one of a number of known protocols to facilitate secure message communication. Examples of known standards and protocols for facilitating secure message communication include the Secure Multiple Internet Mail Extensions ("S/MIME") protocol and the Pretty Good Privacy™ (PGP) protocol.

BRIEF DESCRIPTION OF THE DRAWINGS

For a better understanding of embodiments of the systems and methods described herein, and to show more clearly how they may be carried into effect, reference will be made, by way of example, to the accompanying drawings in which.

DETAILED DESCRIPTION

Some embodiments of the systems and methods described herein make reference to a mobile device. A mobile device may be a two-way communication device with advanced data communication capabilities having the capability to communicate with other computer systems. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities), for example. A mobile device may communicate with other devices through a network of transceiver stations.

Figure 1:
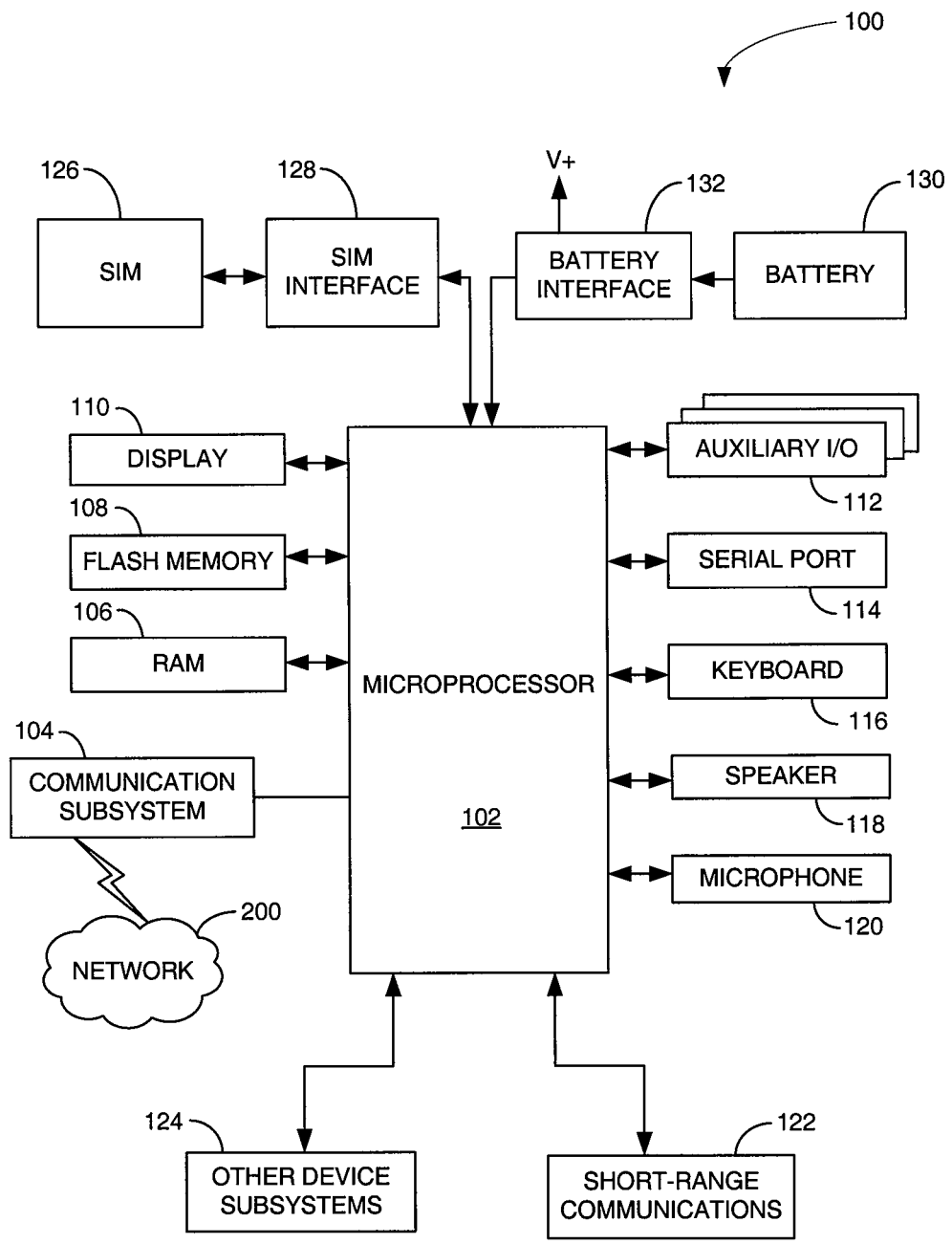
FIG. 1 is a block diagram of a mobile device in one example implementation.
Figure 2:
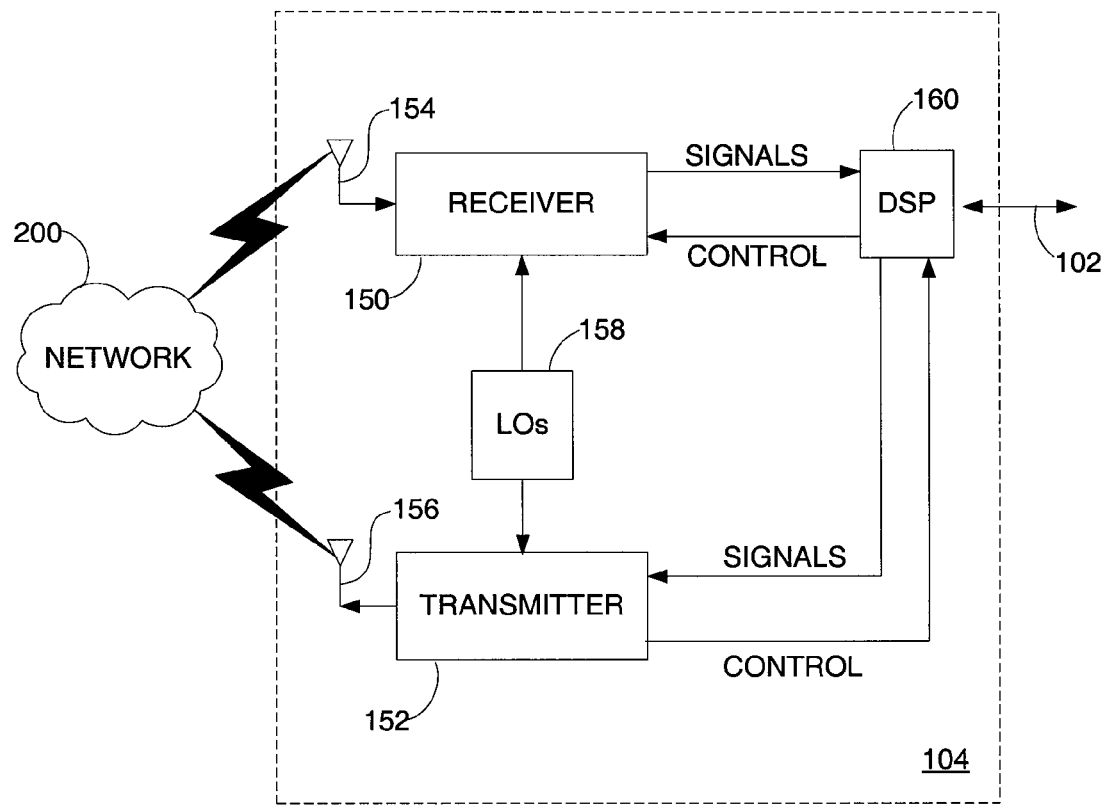
FIG. 2 is a block diagram of a communication subsystem component of the mobile device of FIG. 1.
Figure 3:
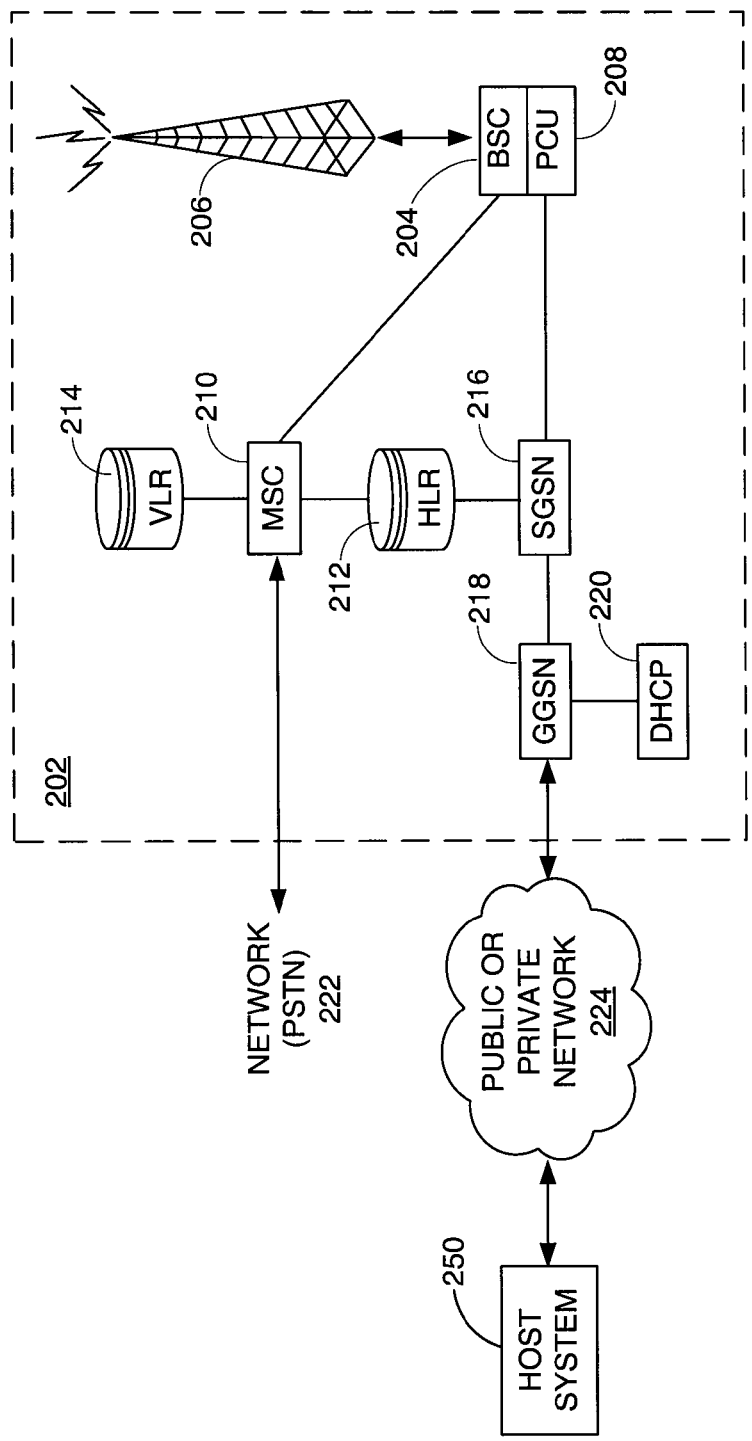
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, may be performed through communication subsystem 104. Communication subsystem 104 may be configured to receive messages from and send messages to a wireless network 200. In one example implementation of mobile device 100, communication subsystem 104 may be configured in accordance with the Global System for Mobile Communication (GSM) and General Packet Radio Services (GPRS) standards. The GSM/GPRS wireless network is used worldwide and it is expected that these standards may be supplemented or superseded eventually by Enhanced Data GSM Environment (EDGE) and Universal Mobile Telecommunications Service (UMTS), and Ultra Mobile Broadband (UMB), etc. New standards are still being defined, but it is believed that they will have similarities to the network behaviour described herein, and it will also be understood by persons skilled in the art that the embodiments of the present disclosure are intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems. Other network communication technologies that may be employed include, for example, Integrated Digital Enhanced Network (iDEN™) Evolution-Data Optimized (EV-DO), and High Speed Packet Access (HSPA), etc.

Microprocessor 102 may also interact with additional subsystems such as a Random Access Memory (RAM) 106, flash memory 108, display 110, auxiliary input/output (I/O) subsystem 112, serial port 114, keyboard 116, speaker 118, microphone 120, short-range communications subsystem 122 and other device subsystems 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, as well as device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after network registration or activation procedures have been completed. Network access may be associated with a subscriber or user of a mobile device 100. To identify a subscriber, mobile device 100 may provide for a Subscriber Identity Module ("SIM") card 126 to be inserted in a SIM interface 128 in order to communicate with a network. SIM 126 may be one example type of a conventional "smart card" used to identify a subscriber of mobile device 100 and to personalize the mobile device 100, among other things. Without SIM 126, mobile device 100 may not be fully operational for communication with network 200. By inserting SIM 126 into SIM interface 128, a subscriber may access all subscribed services. Services may include, without limitation: web browsing and messaging such as e-mail, voice mail, Short Message Service (SMS), and Multimedia Messaging Services (MMS). More advanced services may include, without limitation: point of sale, field service and sales force automation. SIM 126 may include a processor and memory for storing information. Once SIM 126 is inserted in SIM interface 128, it may be coupled to microprocessor 102. In order to identify the subscriber, SIM 126 may contain some user parameters such as an International Mobile Subscriber Identity (IMSI). By using SIM 126, a subscriber may not necessarily be bound by any single physical mobile device. SIM 126 may store additional subscriber information for a mobile device as well, including datebook (or calendar) information and recent call information.

Mobile device 100 may be a battery-powered device and may comprise a battery interface 132 for receiving one or more rechargeable batteries 130. Battery interface 132 may be coupled to a regulator (not shown), which assists battery 130 in providing power V+ to mobile device 100. Although current technology makes use of a battery, future technologies such as micro fuel cells may provide power to mobile device 100. In some embodiments, mobile device 100 may be solar-powered.

Microprocessor 102, in addition to its operating system functions, enables execution of software applications on mobile device 100. A set of applications that control basic device operations, including data and voice communication applications, may be installed on mobile device 100 during its manufacture. Another application that may be loaded onto mobile device 100 is a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality may create a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication include standards developed by the Infrared Data Association (IrDA), Bluetooth®, and the 802.11 family of standards (Wi-Fi®) developed by IEEE.

In use, a received signal such as a text message, an e-mail message, or web page download is processed by communication subsystem 104 and input to microprocessor 102. Microprocessor 102 then processes the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 may comprise an alphanumeric keyboard and/or telephone-type keypad, for example. A composed item may be transmitted over network 200 through communication subsystem 104.

For voice communications, the overall operation of mobile device 100 may be substantially similar, except that the received signals may be processed and output to speaker 118, and signals for transmission may be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 may comprise a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate; thus, it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is generally a limited resource, typically due to limits in overall bandwidth and limited battery power of mobile device 100.

When mobile device 100 is fully operational, transmitter 152 may be typically keyed or turned on only when it is sending to network 200 and may otherwise be turned off to conserve resources. Similarly, receiver 150 may be periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with GPRS and GSM technologies; however, in other embodiments, different standards may be implemented as discussed in more detail above. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) server 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 may be a fixed transceiver station. Station 206 and BSC 204 together may form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile may be stored in HLR 212. HLR 212 may also contain location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times while requiring less use of computing resources.

SGSN 216 and GGSN 218 are elements that may be added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSNs 216 via an Internet Protocol (IP) backbone network operated within the network 200. During normal operations, a given mobile device 100 performs a "GPRS Attach" to acquire an IP address and to access data services. This normally is not present in circuit switched voice channels as Integrated Services Digital Network (ISDN) addresses may be generally used for routing incoming and outgoing calls. Currently, GPRS capable networks may use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server, for example.

Once the GPRS Attach is complete, a logical connection is established from a mobile device 100, through PCU 208, and SGSN 216 to an Access Point Node (APN) within GGSN 218, for example. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot generally exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

Figure 4:
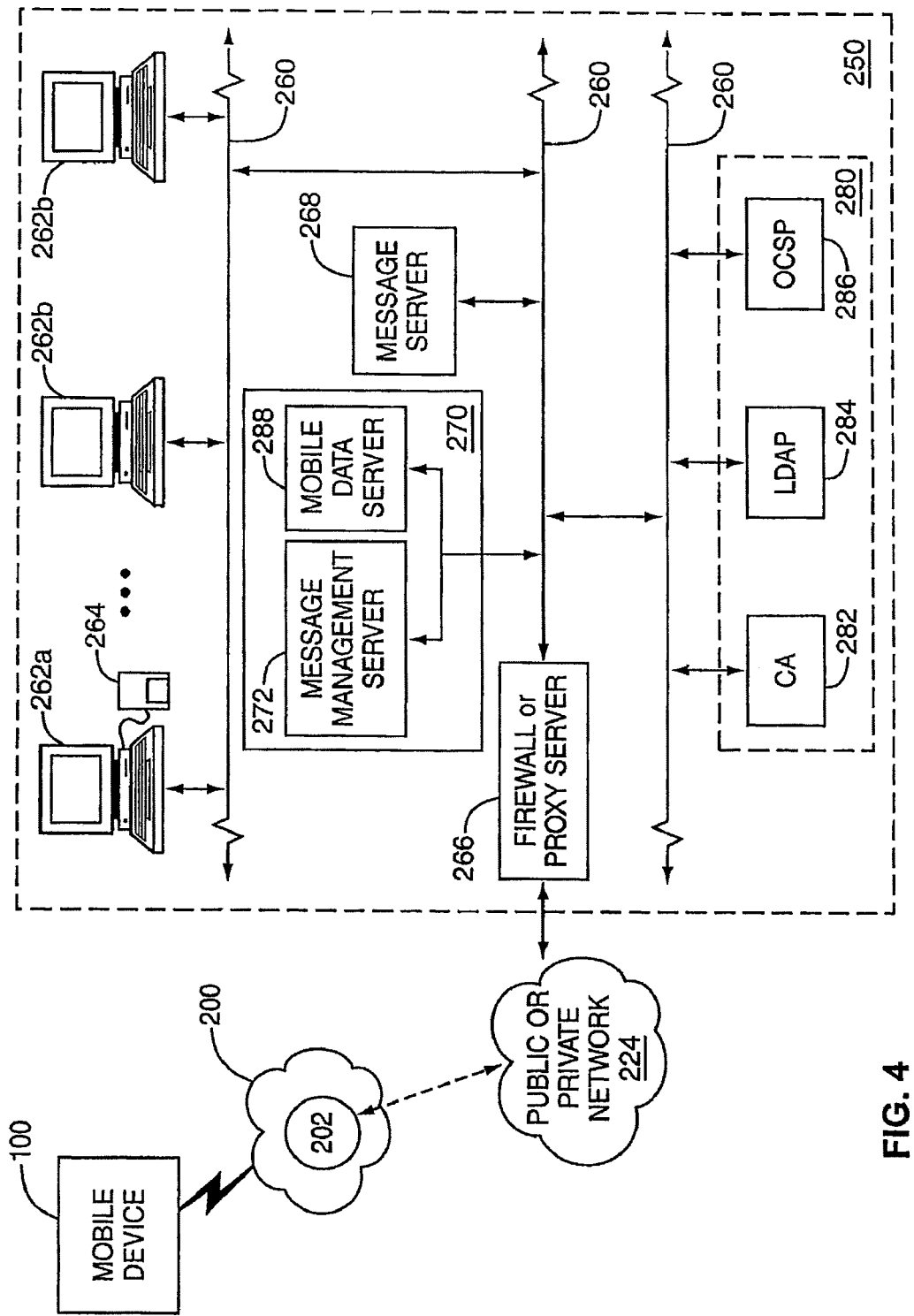
FIG. 4 is a block diagram illustrating components of a host system in one example configuration.

Referring now to FIG. 4, a block diagram illustrating components of a host system in one example configuration is shown. Host system 250 will typically be a corporate office or other local area network (LAN), but may instead be a home office computer or some other private system, for example, in variant implementations. In this example shown in FIG. 4, host system 250 is depicted as a LAN of an organization to which a user of mobile device 100 belongs.

LAN 250 comprises a number of network components connected to each other by LAN connections 260. For instance, a user's desktop computing device ("desktop computer") 262a with an accompanying cradle 264 for the user's mobile device 100 may be situated on LAN 250. Cradle 264 for mobile device 100 may be coupled to computer 262a by a serial or a Universal Serial Bus (USB) connection, for example. Other user computers 262b are also situated on LAN 250, and each may or may not be equipped with an accompanying cradle 264 for a mobile device. Cradle 264 facilitates the loading of information (e.g. PIM data, private symmetric encryption keys to facilitate secure communications between mobile device 100 and LAN 250) from user computer 262a to mobile device 100, and may be particularly useful for bulk information updates often performed in initializing mobile device 100 for use. The information downloaded to mobile device 100 may include S/MIME certificates or PGP keys used in the exchange of messages.

It will be understood by persons skilled in the art that user computers 262a, 262b will typically be also connected to other peripheral devices not explicitly shown in FIG. 4. Furthermore, only a subset of network components of LAN 250 are shown in FIG. 4 for ease of exposition, and it will be understood by persons skilled in the art that LAN 250 will comprise additional components not explicitly shown in FIG. 4, for this example configuration. More generally, LAN 250 may represent a smaller part of a larger network [not shown] of the organization, and may comprise different components and/or be arranged in different topologies than that shown in the example of FIG. 4.

In this example, mobile device 100 communicates with LAN 250 through a node 202 of wireless network 200 and a shared network infrastructure 224 such as a service provider network or the public Internet. Access to LAN 250 may be provided through one or more routers [not shown], and computing devices of LAN 250 may operate from behind a firewall or proxy server 266.

In a variant implementation, LAN 250 comprises a wireless VPN router [not shown] to facilitate data exchange between the LAN 250 and mobile device 100. The concept of a wireless VPN router is new in the wireless industry and implies that a VPN connection can be established directly through a specific wireless network to mobile device 100. The possibility of using a wireless VPN router has only recently been available and could be used when the new Internet Protocol (IP) Version 6 (IPV6) arrives into IP-based wireless networks. This new protocol will provide enough IP addresses to dedicate an IP address to every mobile device, making it possible to push information to a mobile device at any time. An advantage of using a wireless VPN router is that it could be an off-the-shelf VPN component, not requiring a separate wireless gateway and separate wireless infrastructure to be used. A VPN connection may include, for example, a Transmission Control Protocol (TCP)/IP or User Datagram Protocol (UDP)/IP connection to deliver the messages directly to mobile device 100 in this variant implementation.

Messages intended for a user of mobile device 100 are initially received by a message server 268 of LAN 250. Such messages may originate from any of a number of sources. For instance, a message may have been sent by a sender from a computer 262b within LAN 250, from a different mobile device [not shown] connected to wireless network 200 or to a different wireless network, or from a different computing device or other device capable of sending messages, via the shared network infrastructure 224, and possibly through an application service provider (ASP) or Internet service provider (ISP), for example.

Message server 268 typically acts as the primary interface for the exchange of messages, particularly e-mail messages, within the organization and over the shared network infrastructure 224. Each user in the organization that has been set up to send and receive messages is typically associated with a user account managed by message server 268. One example of a message server 268 is a Microsoft Exchange™ Server. In some implementations. LAN 250 may comprise multiple message servers 268. Message server 268 may also be adapted to provide additional functions beyond message management, including the management of data associated with calendars and task lists, for example.

When messages are received by message server 268, they are typically stored in a message store [not explicitly shown], from which messages can be subsequently retrieved and delivered to users. For instance, an e-mail client application operating on a user's computer 262a may request the e-mail messages associated with that user's account stored on message server 268. These messages may then typically be retrieved from message server 268 and stored locally on computer 262a.

When operating mobile device 100, the user may wish to have e-mail messages retrieved for delivery to the mobile device 100. An e-mail client application operating on mobile device 100 may request messages associated with the user's account from message server 268. The e-mail client may be configured (either by the user or by an administrator, possibly in accordance with an organization's information technology (IT) policy) to make this request at the direction of the user, at some pre-defined time interval, or upon the occurrence of some pre-defined event. In some implementations, mobile device 100 is assigned its own e-mail address, and messages addressed specifically to mobile device 100 may be automatically redirected to mobile device 100 as they are received by message server 268.

To facilitate the wireless communication of messages and message-related data between mobile device 100 and components of LAN 250, a number of wireless communications support components 270 may be provided. In this example implementation, wireless communications support components 270 may comprise a message management server 272, for example. Message management server 272 may be used to specifically provide support for the management of messages, such as e-mail messages, that are to be handled by mobile devices. Generally, while messages are still stored on message server 268, message management server 272 may be used to control when, if, and how messages should be sent to mobile device 100. Message management server 272 also facilitates the handling of messages composed on mobile device 100, which are sent to message server 268 for subsequent delivery.

For example, message management server 272 may: monitor the user's "mailbox" (e.g. the message store associated with the user's account on message server 268) for new e-mail messages; apply user-definable filters to new messages to determine if and how the messages will be relayed to the user's mobile device 100; compress and encrypt new messages (e.g. using an encryption technique such as Data Encryption Standard (DES) or Triple DES) and push them to mobile device 100 via the shared network infrastructure 224 and wireless network 200; and receive messages composed on mobile device 100 (e.g. encrypted using Triple DES), decrypt and decompress the composed messages, re-format the composed messages if desired so that they will appear to have originated from the user's computer 262a, and re-route the composed messages to message server 268 for delivery.

Certain properties or restrictions associated with messages that are to be sent from and/or received by mobile device 100 can be defined (e.g. by an administrator in accordance with IT policy) and enforced by message management server 272. These may include whether mobile device 100 may receive encrypted and/or signed messages, minimum encryption key sizes, whether outgoing messages must be encrypted and/or signed, and whether copies of all secure messages sent from mobile device 100 are to be sent to a pre-defined copy address, for example.

Message management server 272 may also be adapted to provide other control functions, such as only pushing certain message information or pre-defined portions (e.g. "blocks") of a message stored on message server 268 to mobile device 100. For example, when a message is initially retrieved by mobile device 100 from message server 268, message management server 272 is adapted to push only the first part of a message to mobile device 100, with the part being of a pre-defined size (e.g. 2 KB). The user can then request more of the message, to be delivered in similar-sized blocks by message management server 272 to mobile device 100, possibly up to a maximum pre-defined message size.

Accordingly, message management server 272 facilitates better control over the type of data and the amount of data that is communicated to mobile device 100, and can help to minimize potential waste of bandwidth or other resources.

It will be understood by persons skilled in the art that message management server 272 need not be implemented on a separate physical server in LAN 250 or other network. For example, some or all of the functions associated with message management server 272 may be integrated with message server 268, or some other server in LAN 250. Furthermore, LAN 250 may comprise multiple message management servers 272, particularly in variant implementations where a large number of mobile devices are supported.

While Simple Mail Transfer Protocol (SMTP), RFC822 headers, and Multipurpose Internet Mail Extensions (MIME) body parts may be used to define the format of a typical e-mail message not requiring encoding, Secure/MIME (S/MIME), a version of the MIME protocol, may be used in the communication of encoded messages (i.e. in secure messaging applications). S/MIME enables end-to-end authentication and confidentiality, and provides data integrity and privacy from the time an originator of a message sends a message until it is decoded and read by the message recipient. Other standards and protocols may be employed to facilitate secure message communication, such as Pretty Good Privacy™ (PGP) and variants of PGP such as OpenPGP, for example. It will be understood that where reference is generally made to "PGP" herein, the term is intended to encompass any of a number of variant implementations based on the more general PGP scheme.

Secure messaging protocols such as S/MIME and PGP-based protocols rely on public and private encryption keys to provide confidentiality and integrity. Data encoded using a private key of a private key/public key pair can only be decoded using the corresponding public key of the pair, and data encoded using a public key of a private key/public key pair can only be decoded using the corresponding private key of the pair. It is intended that private key information never be made public, whereas public key information is shared.

For example, if a sender wishes to send message data to a recipient in encrypted form, the recipient's public key is used to encrypt the message data, which can then be decrypted only using the recipient's private key. Alternatively, in some encoding techniques, a one-time session key is generated and used to encrypt the message data, typically with a symmetric encryption technique (e.g. Triple DES). The session key is then encrypted using the recipient's public key (e.g. with a public key encryption algorithm such as RSA), which can then be decrypted only using the recipient's private key. The decrypted session key can then be used to decrypt the encrypted message data. The message header may comprise data specifying the particular encryption scheme that must be used to decrypt the encrypted message data. Other encryption techniques based on public key cryptography may be used in variant implementations. However, in each of these cases, only the recipient's private key may be used to facilitate successful decryption of the encrypted message data, and in this way, the confidentiality of that data can be maintained.

As a further example, a sender may sign message data using a digital signature. A digital signature generally comprises a digest of the message data being signed (e.g. a hash of the message data being signed) encoded using the sender's private key, which can then be appended to the outgoing message. To verify the digital signature when received, the recipient uses the same technique as the sender (e.g. using the same standard hash algorithm) to obtain a digest of the received message data. The recipient also uses the sender's public key to decode the digital signature, in order to obtain what should be a matching digest for the received message data. If the digests of the received message do not match, this suggests that either the message data was changed during transport and/or the message data did not originate from the sender whose public key was used for verification. Digital signature algorithms are designed in such a way that only someone with knowledge of the sender's private key should be able to encode a digital signature that the recipient will decode correctly using the sender's public key. Therefore, by verifying a digital signature in this way, authentication of the sender and message integrity can be maintained.

In the description of exemplary embodiments herein, the term "secure encoding" is used. When reference is made to the application of a secure encoding to message data, this means that the message data is encoded using an encoding technique. As noted above, an act of encoding message data may include either encrypting the message data or signing the message data. It will be understood that encoded message data may also be both encrypted and signed. As used in this disclosure, "signed and/or encrypted" means signed or encrypted or both.

In S/MIME, the authenticity of public keys used in these operations may be validated using certificates. A certificate is a digital document issued, for example, by a certificate authority (CA). Certificates are used to authenticate the association between users and their public keys, and essentially, provides a level of trust in the authenticity of the users' public keys. Certificates contain information about the certificate holder, with certificate contents typically formatted in accordance with an accepted standard (e.g. X.509). The certificates are typically digitally signed by the certificate authority.

In PGP-based systems, a PGP key is used, which is like an S/MIME certificate in that it contains public information including a public key and information on the key holder or owner. Unlike S/MIME certificates, however, PGP keys are not generally issued by a certificate authority, and the level of trust in the authenticity of a PGP key typically requires verifying that a trusted individual has vouched for the authenticity of a given PGP key.

While the term "PGP key" may not be commonly used interchangeably with the term "certificate", in the context of the embodiments described herein and for the purposes of the specification and in the claims, a "certificate" is deemed to include similar constructs of other secure messaging protocols such as a PGP key.

Standard e-mail security protocols typically facilitate secure message transmission between non-mobile computing devices (e.g. computers 262a, 262b of FIG. 4; remote desktop devices). In order that signed messages received from senders may be read from mobile device 100 and that encrypted messages be sent from mobile device 100, mobile device 100 may be adapted to store public keys (e.g. in S/MIME certificates, PGP keys) of other individuals. Keys stored on a user's computer 262a may be downloaded from computer 262a to mobile device 100 through cradle 264, for example.

Mobile device 100 may also be adapted to store the private key of the public key/private key pair associated with the user, so that the user of mobile device 100 can sign outgoing messages composed on mobile device 100, and decrypt messages sent to the user encrypted with the user's public key. The private key may be downloaded to mobile device 100 from the user's computer 262a through cradle 264, for example. The private key may be exchanged between the computer 262a and mobile device 100 so that the user may share one identity and one method for accessing messages.

User computers 262a, 262b can obtain S/MIME certificates and PGP keys from a number of sources, for storage on computers 262a, 262b and/or mobile devices (e.g. mobile device 100) in a key store, for example. The sources of these certificates and keys may be private (e.g. dedicated for use within an organization) or public, may reside locally or remotely, and may be accessible from within an organization's private network or through the Internet, for example. In the example shown in FIG. 4, multiple public key infrastructure (PKI) servers 280 associated with the organization reside on LAN 250. PKI servers 280 include a CA server 282 that may be used for issuing S/MIME certificates, a Lightweight Directory Access Protocol (LDAP) server 284 that may be used to search for and download S/MIME certificates and/or PGP keys (e.g. for individuals within the organization), and an Online Certificate Status Protocol (OCSP) server 286 that may be used to verify the revocation status of S/MIME certificates, for example.

Certificates and/or PGP keys may be retrieved from LDAP server 284 by a user computer 262a, for example, to be downloaded to mobile device 100 via cradle 264. However, in a variant implementation, LDAP server 284 may be accessed directly (i.e. "over the air" in this context) by mobile device 100, and mobile device 100 may search for and retrieve individual certificates and PGP keys through a mobile data server 288. Similarly, mobile data server 288 may be adapted to allow mobile device 100 to directly query OCSP server 286 to verify the revocation status of S/MIME certificates.

In variant implementations, only selected PKI servers 280 may be made accessible to mobile devices (e.g. allowing certificates to be downloaded only from a user's computer 262a, 262b, while allowing the revocation status of certificates to be checked from mobile device 100).

In variant implementations, certain PKI servers 280 may be made accessible only to mobile devices registered to particular users, as specified by an IT administrator, possibly in accordance with an IT policy, for example.

Other sources of S/MIME certificates and PGP keys [not shown] may include a Windows certificate or key store, another secure certificate or key store on or outside LAN 250, and smart cards, for example.

Figure 5:
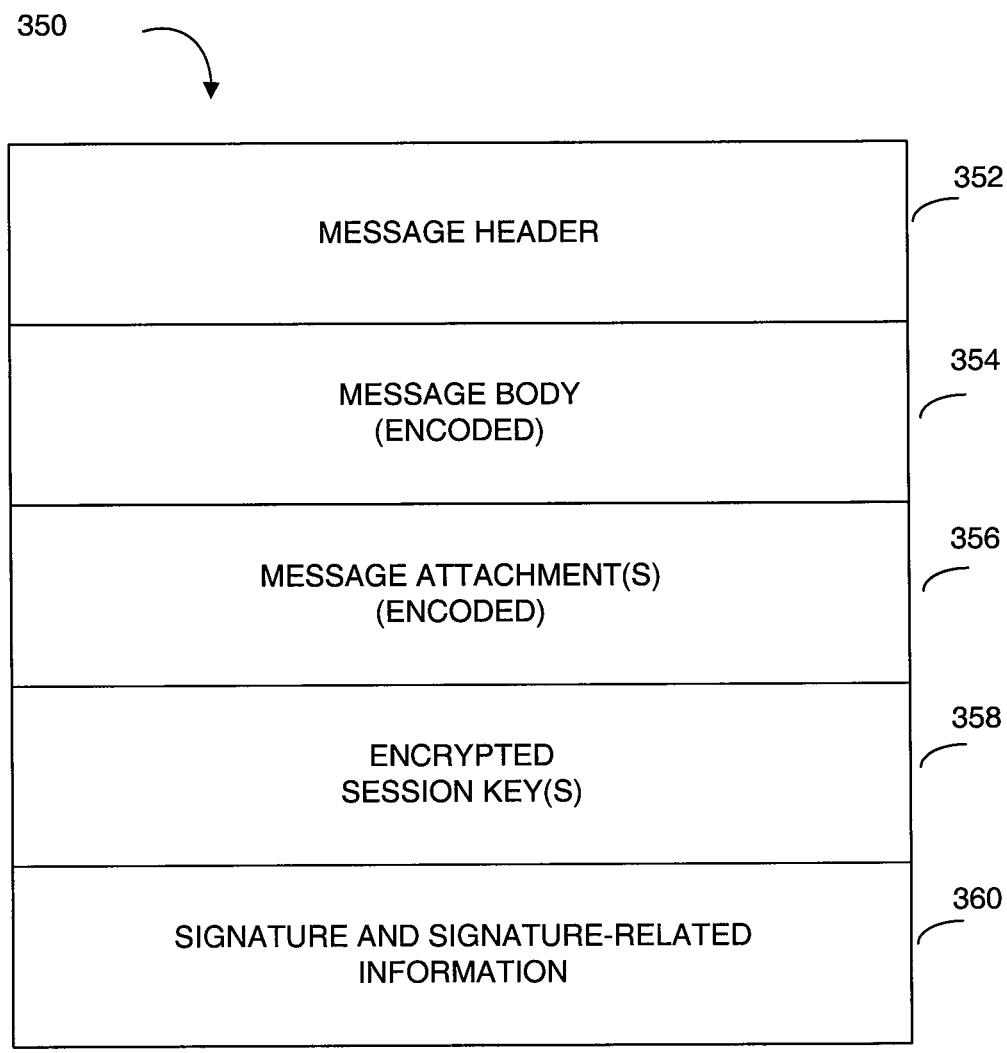
FIG. 5 is a block diagram illustrating components of an example of an encoded message.

Referring now to FIG. 5, a block diagram illustrating components of one example of an encoded message, as may be received by a message server (e.g. message server 268 of FIG. 4) and forwarded to a user (e.g. of mobile device 100), is shown generally as 350. Encoded message 350 may comprise one or more of the following: a message header 352, one or more encrypted session keys 358 (e.g. if the message is encrypted), a message body 354, optionally one or more attachments 356 that may be encoded, digital signature and signature-related information 360. For example, message header 352 for message 350 may comprise one or more header fields such as "To", "From", "Cc", "Bcc", "Date", "Reply-To", and "Subject", and may also comprise message length indicators, and encryption and signature scheme identifiers, for example. Actual message content ("message data") is normally included in the message body 354 and possibly in one or more attachments 356, which may be encrypted by the sender, using a session key for example. If a session key is to be used, it is typically encrypted for each intended recipient using the respective public key for each recipient, and included in the message at 358. If the message is signed, a digital signature and signature-related information 360 are included.

The format for an encoded message as shown in FIG. 5 is provided by way of example only, and persons skilled in the art will understand that encoded messages may exist in other formats. For example, encrypted session keys 358 may be provided after message header 352 but before message body 354. Depending on the specific secure messaging standard or protocol employed, components of an encoded message may appear in a different order than shown in FIG. 5, and an encoded message may include fewer, additional, or different components, which may depend on whether message data of the encoded message is encrypted, signed or both.

Under existing standards and protocols, the header fields of an encoded electronic mail message (e.g. message 350) are generally not secured (e.g. the contents of the header fields 352 are not encoded). Accordingly, a recipient of a message from a sender could change the contents of one or more header fields (e.g. the subject) in the message header and resend the message with the changed header to a second recipient without decoding the message body. After the message is resent, there is no way for the second recipient to confirm that the original contents in the header fields of the message header have not been tampered with. The digital signature of the message would still verify and/or the encrypted message body would still be decryptable, and it would appear as if the message came directly from the sender since typically only the message body, and not the message header, is encoded (e.g. signed and/or encrypted) under existing standards and protocols. As a further example, a third party may intercept a message in transit, and surreptitiously change the content of the subject field in the message header before it arrives at the recipient's device. The recipient would not know that the original content of the subject field in the message header has been changed.

In the above-described examples, the present inventors recognized that it may be desirable to preserve the integrity of the entire message, including the contents of the header fields in a message header. There may also be situations where confidentiality of the contents of the header fields (e.g. the subject) in a message header of a message may be desirable.

Embodiments of the systems and methods described herein generally facilitate the transmitting, receiving, and processing of encoded messages wherein one or more header fields in a message header of the message are protected. In one broad aspect, the contents of the one or more header fields to be protected are inserted into the message body by the message sender's device prior to encoding and transmitting the message to a message recipient, but typically after a user has finished composing the message and directed the device to send the message (e.g. by pressing a "send" button in a user interface provided on the sender's device). Subsequently, upon receipt of the message, the message recipient's device will process the encoded message such that the contents of the protected header fields can be extracted (e.g. viewed and/or verified). Accordingly, by inserting the contents of one or more header fields to be protected into the message body prior to transmission of the message from the sender's device to the recipient's device, the contents of these header fields can then be protected using existing standards and protocols for facilitating secure message communication, as the contents of these header fields are now contained within the message body.

In another broad aspect, there is provided a method and system for transmitting an encoded message from a computing device (i.e. the message sender's device) to a message recipient at another computing device, the message comprising a message header and a message body, the message header comprising a plurality of header fields, the method comprising: inserting content of one or more header fields to be protected of the plurality of header fields into the message body; encoding the message body; and transmitting the message after said encoding to the message recipient, such that when the message is processed by the message recipient, the content of the one or more header fields to be protected is extractable from the message body. In some embodiments, the one or more header fields to be protected comprises a subject field.

In another broad aspect, there is provided a method and system for receiving an encoded message at a computing device (i.e. the message recipient's device) from a message sender at another computing device, the message comprising a message header and a message body, the message header comprising one or more header fields, the method comprising: receiving the encoded message from the message sender, wherein the encoded message comprises an encoded message body, the encoded message body comprising content of one or more protected header fields inserted by the message sender's device therein; decoding the encoded message body; and extracting the content of the one or more protected header fields from the message body after said decoding. In some embodiments, the one or more protected header fields comprises a subject field.

In at least one example embodiment, the extracting comprises: searching the message body, after said decoding, for the content of the one or more protected header fields; and where said content is located by said searching, inserting the content of the one or more protected header fields located by said searching in a corresponding one or more header fields of the message header.

In example embodiments, the sender's device may be a mobile device 100 or some other computing device. Similarly, the recipient's device may be a mobile device 100 or some other computing device These and other aspects and features of various embodiments will be described in greater detail below. It should be noted by persons skilled in the art that the embodiments described above are applicable to both signed and/or encrypted messages.

Figure 6A:
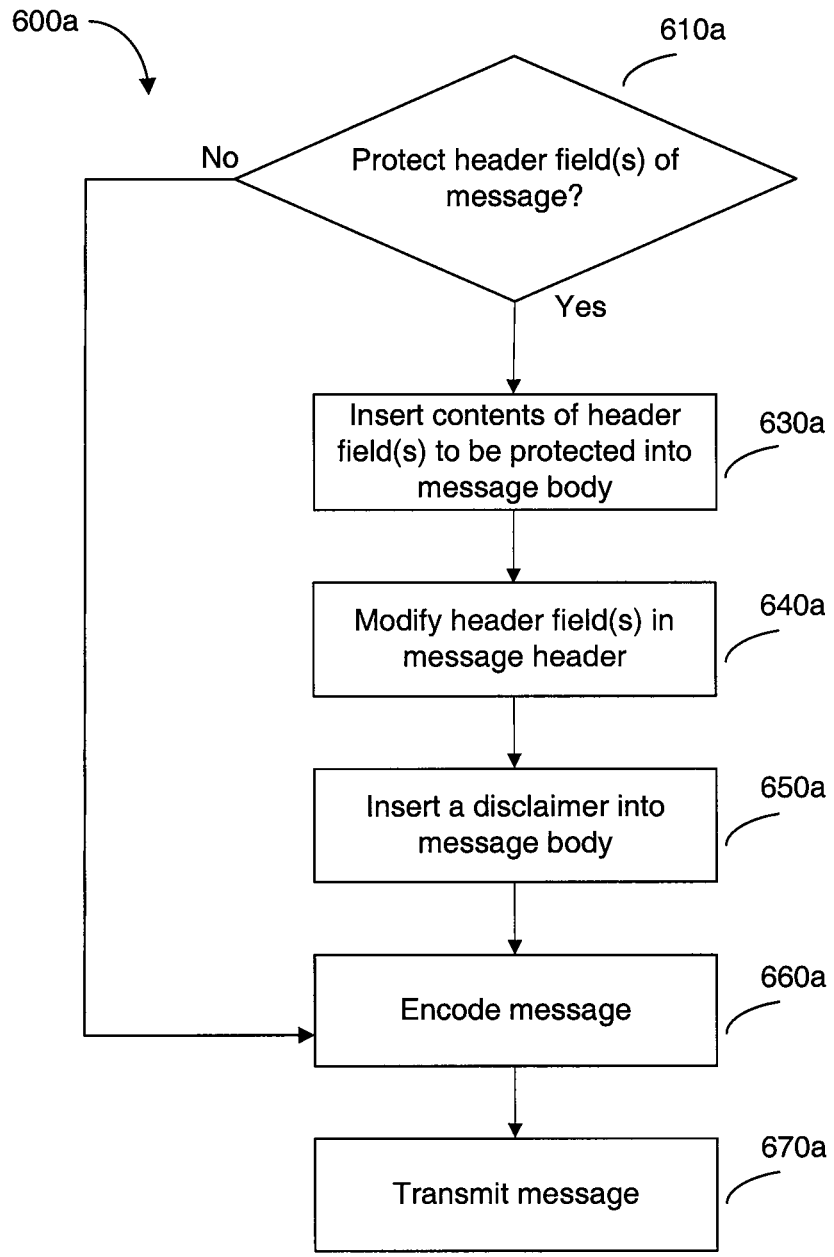
FIGS. 6A and 6B are flowcharts illustrating acts of a method of transmitting an encoded message from a computing device (i.e. the message sender's device) to a message recipient at another computing device in accordance with at least one embodiment.

Referring first to FIG. 6A, a flowchart illustrating acts of a method 600a of transmitting an encoded message (e.g. message 350 of FIG. 5) from a computing device (i.e. the message sender's device) to a message recipient at another computing device, wherein one or more header fields are to be protected, is shown, in accordance with at least one embodiment.

In at least one embodiment, at least some of the acts of the method 600a are performed by a processor executing an application residing on a computing device, such as a mobile device (e.g. mobile device 100 of FIG. 1). In variant embodiments, the application may reside on a computing device other than a mobile device. In at least one embodiment, the application is an e-mail application, although the acts of the method may be performed in the execution of one or more different applications in variant embodiments.

By way of illustration, references are made below to the parts of the example message as shown in FIG. 5.

At 610a, a determination is made as to whether one or more header fields in the message header 352 are to be protected. The determination may be based on input from the sender of the message 350, generally the user of the computing device, or based on a pre-set configuration setting, for example.

For example, the determination at 610a may be made based on user input provided via a user interface, in which the user may be presented with an option and be required to indicate whether one or more header fields are to be protected, and if so, which header fields are to be protected. This may be done on a message-by-message basis, after the user has finished composing the message 350 and directed the computing device to send the message 350 (e.g. by pressing a "send" button or similar option in the user interface), for example. Alternatively, this may be done while the user is still composing the message 350 (e.g. after the user has finished entering content into the message header 352, but before or while the user is entering content into the message body 354), and before the user has directed the device to send the message 350 (e.g. by pressing a "send" button or similar option in the user interface). Another alternative is that the option may be presented to the user prior to the composition of message 350, for example, upon installation of the application, or upon a powering on of the computing device. The user may be provided with the option of protecting selected header fields, on a message-by-message basis, for all messages, or for all messages meeting certain criteria (e.g. when the message is to be sent to one or more designated recipients). To be clear, all header fields may be protected or a selected subset of header fields may be protected as identified by a user.

In some other instances, there may be no option provided to the user at all. For example, the sender's device may be configured to automatically protect all header fields or certain header fields. The protection of header fields may be initiated by an administrator, for example, via an IT policy or other configuration settings in variant embodiments.

Notwithstanding that a user may have manually selected which header fields they would like to be protected at 610a, it should be understood by persons skilled in the art that this selection can be overridden by the configuration settings as defined by the device or an administrator (e.g. via an IT policy), for example, in variant embodiments.

If it is not desired to protect any of the header fields, then the flow of method acts proceeds to 660a where the message 350 (specifically, at least the message body 354 and possibly message attachments 356) is securely encoded using one of a number of known standards and protocols for facilitating secure message communication, for subsequent transmission at 670a to the intended message recipient.

However, if it is desired to protect one or more header fields, then the flow of method acts proceeds to 630a. At 630a, the contents of the one or more header fields to be protected as determined at 610a are inserted into the message body 354, for example, as one or more additional lines of text. In one example embodiment, the contents of the one or more header fields to be protected may be inserted into the message body 354 as one or more additional lines of text prefaced by a description, for example: "Secure <name of header field>: <contents of header field>" (e.g. "Secure subject: Do you want to go for lunch?"). The insertion of the header field contents into the message body 354 may be done after the user has finished composing the message and directed the device to send the message (e.g. by pressing a "send" button or similar option in a user interface). This insertion may be done automatically by the application, with no user intervention (i.e. not requiring the user to manually insert the contents of the one or more header fields to be protected into the message body 354), which may increase user convenience.

By inserting the contents of the one or more header fields into the message body 354, the one or more header fields can then be automatically protected when the message 350 is encoded at 660a using existing standards and protocols for facilitating secure message communication, which typically encode the message body 354 of a message 350 but not the message header 352. This may allow existing standards and protocols for encoding to be used and the recipient's device does not have to be specially configured to be able to decode the message 350 (e.g. a custom application specifically designed to process these types of messages 350 would not be required).

At 640a, subsequent to the insertion of contents of the one or more header fields to be protected into the message body 354 at 630a, the message header 352 can be optionally modified. In one embodiment, the original contents of the one or more header fields to be protected may be deleted, and the header fields left blank. Effectively, the combination of inserting the contents of the one or more header fields to be protected into the message body 354 at 630a and deleting the original contents of the one or more header fields to be protected at 640 results in the contents of the one or more header fields to be protected being moved into the message body 354.

In another embodiment, the original contents of the one or more header fields to be protected may be modified to indicate that one or more of the header fields have been protected. By way of illustration, each of the header fields that have been protected may be modified to say, for example: "HEADER FIELD ENCRYPTED", "HEADER FIELD ELIDED", or "HEADER FIELD IN BODY". By modifying the message header 352 as described above, this provides confidentiality of the contents of the header fields, while explicitly notifying recipients that the original contents can be retrieved.

In another embodiment, the contents of one or more header fields to be protected may not be deleted or modified at 640a, but is instead retained in the message header 352 "as is" (i.e. unchanged from the original). This would allow for a message recipient to manually check (i.e. by visual comparison) if any of the header fields in the message header 352 have been tampered with, by comparing the contents of the header fields in the message header 352 as received with those as inserted into the message body 354 (after the message body is decoded, where necessary). Alternatively, this check may be performed automatically at the message recipient's device in a variant embodiment, as will be described in further detail below in accordance with methods 700c and 700d of FIGS. 7C and 7D.

At 650a, a disclaimer can be optionally inserted into the message body 354 to indicate that one or more header fields have been protected. The disclaimer may comprise text such as, for example: "One or more header fields in this electronic mail message have been protected by inserting the protected header fields into the message body." By inserting a disclaimer, this allows message recipients at computing devices using messaging applications that do not support the automatic processing of messages that have been modified to protect the header field contents as described herein, to understand why the contents of one or more header fields have been inserted into the message body 354.

At 660a, the message 350 (specifically, at least the message body 354 and possibly message attachments 356), with the contents of the one or more header fields to be protected inserted therein at 630a, is securely encoded by one of a number of known standards and protocols for facilitating secure message communication.

At 670a, the message is then transmitted to the intended message recipient(s).

Figure 6B:
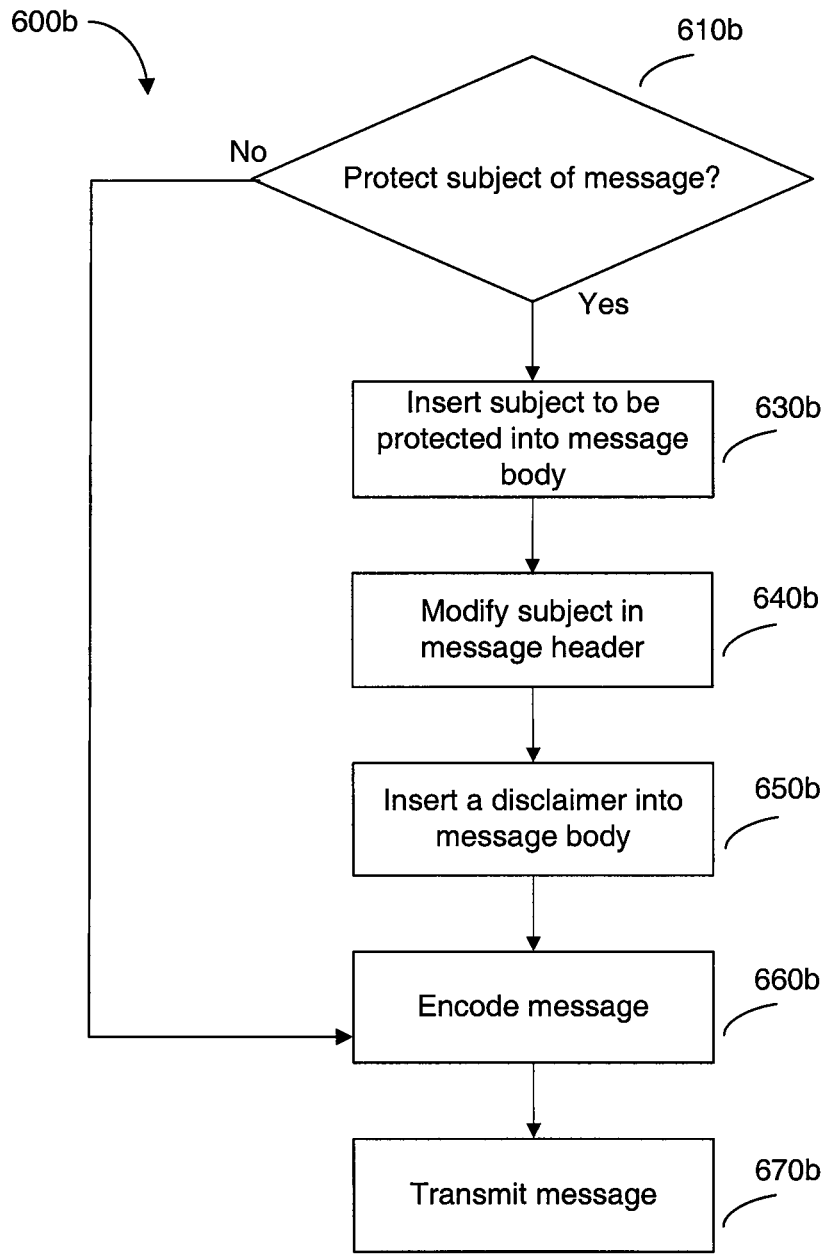

FIG. 6B is a flowchart illustrating method 600b, a specific variation of method 600a of FIG. 6A. The flowchart in FIG. 6B is similar to the flowchart in FIG. 6A except that the one or more header fields to be protected specifically comprise a subject field. Each act, 610b to 670b, is analogous to a corresponding act 610a to 670a of FIG. 6A respectively, and the reader is directed to the description of FIG. 6A for further details.

Figure 7A:
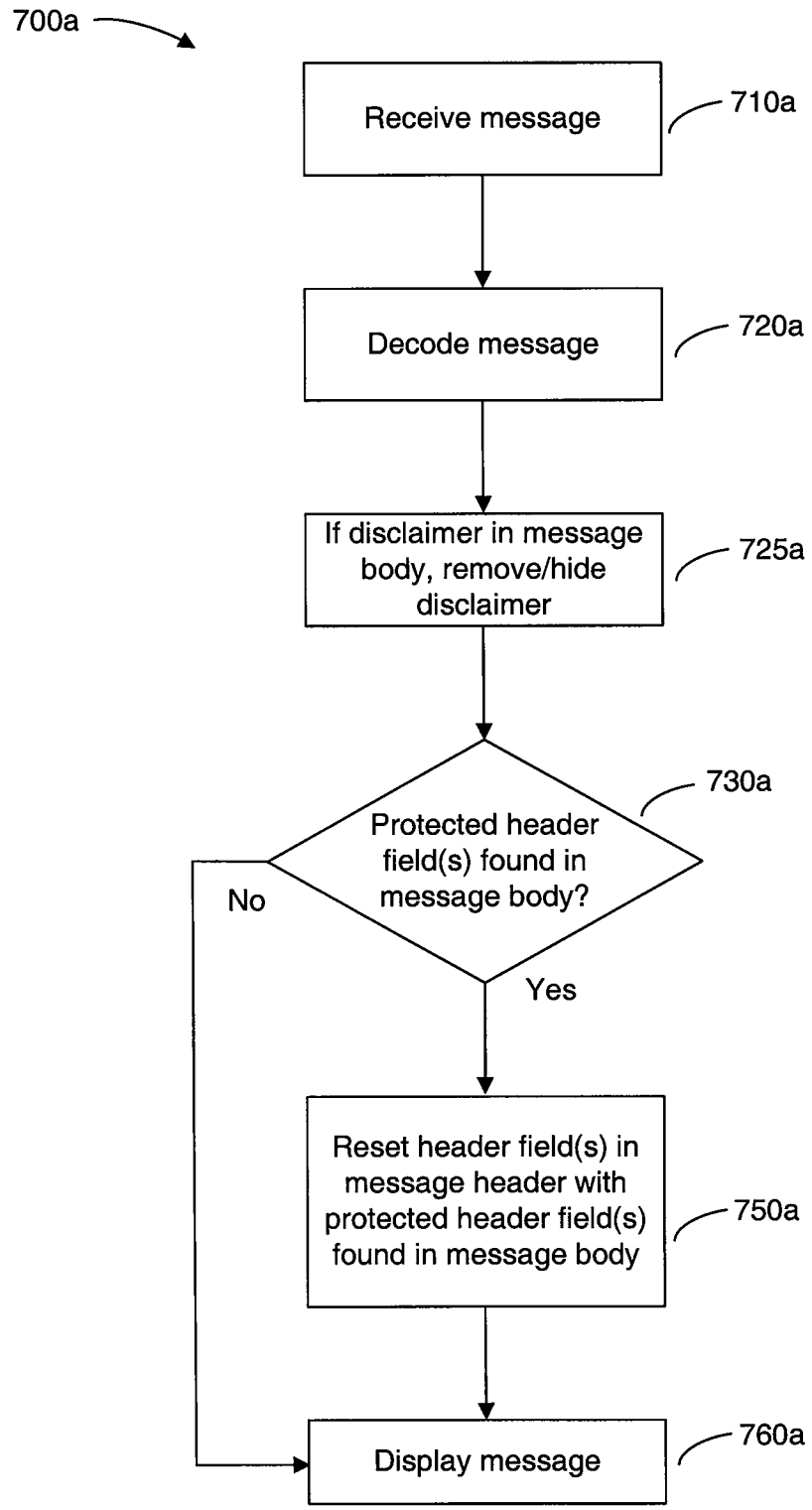
FIGS. 7A, 7B, 7C and 7D are flowcharts illustrating acts of a method of receiving an encoded message at a computing device (i.e. the message recipient's device) from a message sender at another computing device in accordance with at least one embodiment.

Referring next to FIG. 7A, a flowchart illustrating acts of a method 700a of receiving an encoded message (e.g. message 350 of FIG. 5) at a computing device (i.e. a message recipient's device) from a message sender at another computing device, wherein the contents of one or more protected header fields have been inserted into the message body (e.g. message body 354 of FIG. 5), is shown, in accordance with at least one embodiment.

By way of illustration, references are made below to the parts of the example message as shown in FIG. 5.

In at least one embodiment, at least some of the acts of the method are performed by a processor executing an application residing on a computing device, such as a mobile device (e.g. mobile device 100 of FIG. 1). In variant embodiments, the application may reside on a computing device other than a mobile device. In at least one embodiment, the application is an e-mail application, although the acts of the method may be performed in the execution of one or more different applications in variant embodiments.

At the recipient's computing device, an encoded message 350 (e.g. an encoded e-mail message) received from a message sender at 710a is processed by first decoding the encoded message 350 at 720a using one of a number of known standards and protocols for facilitating secure message communication.

At 725a, the message body 354 of the decoded message 350 may optionally be checked for whether a disclaimer has been inserted therein (e.g. in accordance with act 650a of FIG. 6A as previously described) to indicate that one or more header fields have been protected. As previously described, the presence of a disclaimer allows message recipients at computing devices using messaging applications that do not support the automatic processing of messages that have been modified to protect header field contents, as described herein, to understand why the contents of one or more header fields have been inserted into the message body 354. At 725a, when a disclaimer is located in the message body 354, the disclaimer may be automatically removed from or hidden in the message body 354.

In one embodiment, the decoded message 350 can be automatically processed in accordance with subsequent acts of method 700a so that the contents of one or more protected header fields can be extracted (e.g. viewed and/or verified) from the message body 354. In one example embodiment, the extracting comprises: searching the message body 354 of the decoded message 350 for the contents of the one or more protected header fields inserted therein, at 730a; and inserting the contents of the one or more protected header fields as located in the message body 354, back in the message header 352 of the decoded message 350, at 750a. In some of these embodiments, the extracting may always occur. However, in other embodiments, the extracting may only occur if one or more header fields in the decoded message 350 had been modified (e.g. in accordance with 640a of FIG. 6A as previously described) to indicate that one or more of the header fields has been protected, with the respective header field stating for example: "HEADER FIELD ENCRYPTED", "HEADER FIELD ELIDED", or "HEADER FIELD IN BODY".

However, for non-conforming legacy applications (i.e. applications that do not specifically support the processing of encoded messages wherein the header fields in the message header are protected in accordance with embodiments described herein), acts 730a and 750a may not be performed by the application, but may instead be performed manually by the message recipient.

Further details in respect of acts 730a and 750a are now provided. At 730a, a determination may be optionally made as to whether the message body 354 of the decoded message 350 contains the contents of one or more protected header fields, inserted in accordance with act 630a (FIG. 6A) as previously described, for example. Message body 354 of the decoded message 350 may be searched for one or more protected header fields inserted therein. For example, as previously described, the contents of the one or more protected header fields may have been inserted into the message body 354 as one or more additional lines of text, for example, as one or more additional lines of text prefaced by a description: "Secure <name of header field>: <contents of header field>" (e.g. "Secure subject: Do you want to go for lunch?"). Accordingly, the message body 354 may be searched for the additional lines of text prefaced by a specific description, and the lines of text as containing the contents of a protected header field may be identified.

If the contents of one or more protected header fields are not located in the search of the message body 354 at 730a, then this indicates that the header fields 352 of the message 350 have not been protected in accordance with method 600a described in FIG. 6A and the entirety of the message 350 as it is received may be displayed at 760a for the message recipient.

If, however, the contents of one or more protected header fields are located in the search of the message body 354 at 730a, then this indicates that the header fields of the message 350 have been protected in accordance with method 600a described in FIG. 6A. At 750a, the header fields in the message header 352 may be reset by inserting contents of the one or more header fields as located in the message body 354 of the decoded message 350 at act 730a back into the message header 352 for display to the user. The resetting of the header fields in the message header 352 with the contents of header fields located in the message body 354 of the decoded message 350 ensures the integrity of the message header 352, as it is typically only the message body 354 (and not the message header 352) which is encoded using existing standards and protocols for facilitating secure message communication. The resetting of the header fields at this stage (e.g. before the received message is made available to a user for display) may also allow for faster display and searching of the message 350 in a message list by a user for example, when the received message is subsequently retrieved.

Additionally, act 750a may further comprise deleting the contents of one or more header fields as located in the message body 354 of the received decoded message 350 on resetting the message header 352.

In some embodiments, the resetting of one or more header fields at 750a need not be performed immediately subsequent to 730a, but may instead be deferred until the opening of the message 350 is initiated by the message recipient. Resetting the header fields earlier may allow the message to be displayed more quickly when the user ultimately decides to view the message. On the other hand, processing power may be conserved by deferring the act of resetting the header fields, in the event that a particular message is never opened.

Subsequent to resetting the message header 352 with the one or more header fields to be protected located in the message body 354 of the decoded message 350 at 750a, the message 350 may be displayed at 760a in a message listing.

In one example implementation, in addition to displaying the message header 352 and message body 354, the display may comprise a bar, icon, highlighting, or other indicia, or a combination thereof, in a user interface that indicates to the message recipient that both the message header 352 and message body 354 have been protected, as illustrated in the examples provided in FIGS. 9A and 9B which will be described in more detail below. The indicia may indicate which of the one or more header fields have been protected. For example, the indicia may be a bar, wherein at least a part of the bar is displayed adjacent to the one or more protected header fields in the message header. As a further example, the indicia may be an icon. The icon may be displayed adjacent to the one or more protected header fields in the message header, for example. As another example, the indicia may be that the one or more protected header fields in the message header are highlighted and/or that data in the one or more protected header fields in the message header are highlighted. As another example, the indicia may comprise a combination of features.

Figure 7B:
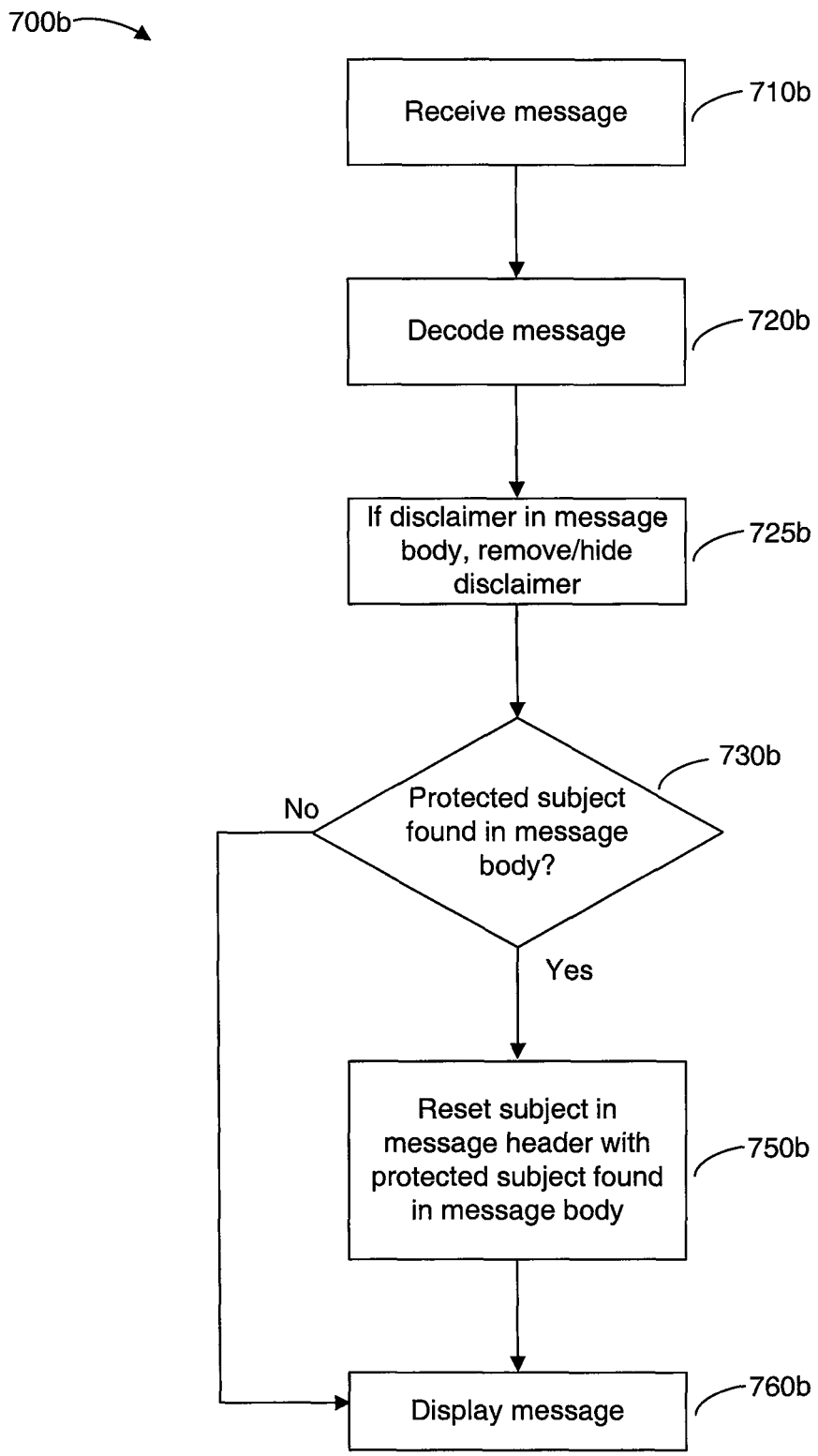

FIG. 7B is a flowchart illustrating method 700*b*, a specific variation of method 700*a* of FIG. 7A. The flowchart in FIG. 7B is similar to the flowchart in FIG. 7A except that the one or more protected header fields specifically comprise a subject field. Each act, 710*b* to 760*b*, is analogous to a corresponding act 710*a* to 760*a* of FIG. 7A respectively, and the reader is directed to the description of FIG. 7A for further details.

Figure 7C:
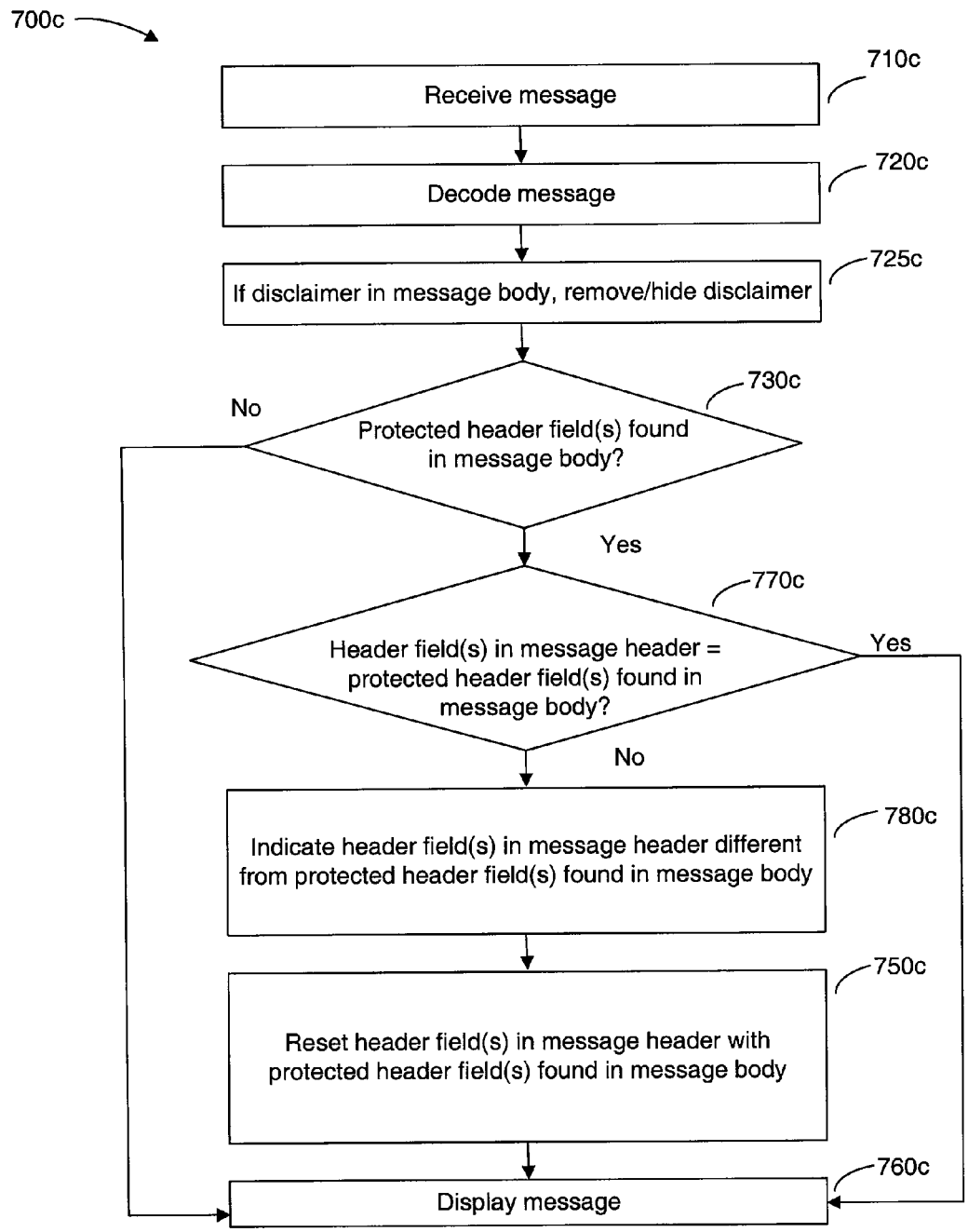

Reference is now made to FIG. 7C, where a flowchart illustrating acts of a method 700*c* of receiving an encoded message at a computing device (i.e. a message recipient's device) from a message sender at another computing device, wherein the contents of one or more protected header fields have been inserted into the message body 354, is shown in accordance with at least one embodiment. Each act 710*c* to 780*c* is analogous to a corresponding act 710*a* to 780*a* of FIG. 7A respectively, and the reader is directed to the description of FIG. 7A for further details. However, method 700*c* of FIG. 7C further differs from method 700*a* of FIG. 7A in that the flow of method acts does not proceed directly from searching the message body 354 of the decoded message 350 for the contents of one or more protected header fields inserted therein (i.e. act 730*c*) to resetting the message header 352 with the one or more protected header fields located in the message body 354 of the decoded message 350 (i.e. act 750*c*). Instead, method 700*c* assumes that the original contents of the header fields to be protected were left in the respective header fields. Method 700*c* additionally comprises performing a comparison of the contents of the one or more protected header fields located in the message body 354 of the decoded message 350 with the corresponding header fields of the message header 352.

Accordingly, if it is determined, at 770*c*, that the contents of the one or more protected header fields as located in the message body 354 do not match the corresponding header fields of the message header 352, then this indicates that the header fields of the message 350 have been tampered with, and an indicia may optionally be provided to the message recipient to indicate so at 780*c*. For example, a warning or an error message can be shown to the message recipient when the message 350 is opened for display at 760*c*. The warning or error message may read, for example: "ALERT! One or more header fields in this electronic mail message have been tampered with during communication." As a further example, an icon indicating that there is a mismatch may be displayed. As a further example, the indicia may be that the header fields of the message 350 are not displayed in the message list at 760*c*.

Notwithstanding that the contents of the one or more protected header fields as located in the message body 354 do not match the corresponding header fields of the message header 352, method 700*c* may optionally proceed to 750*c* where the header fields in the message header 352 may be reset with the one or more header fields located in the message body 354 of the decoded message 350, as previously described with reference to 750*a* of FIG. 7A. Alternatively, the flow of method acts may proceed directly to 760*c* from 780*c* (not explicitly shown in FIG. 7C).

On the other hand, if it is determined that the contents of the one or more protected header fields as located in the message body 354 match the corresponding header fields of the message header 352 at 770*c*, the flow of method acts may proceed to 760*c*.

At 760*c*, the message 350 may be displayed in a message listing, as previously described with reference to 760*a* of FIG. 7A.

Figure 7D:
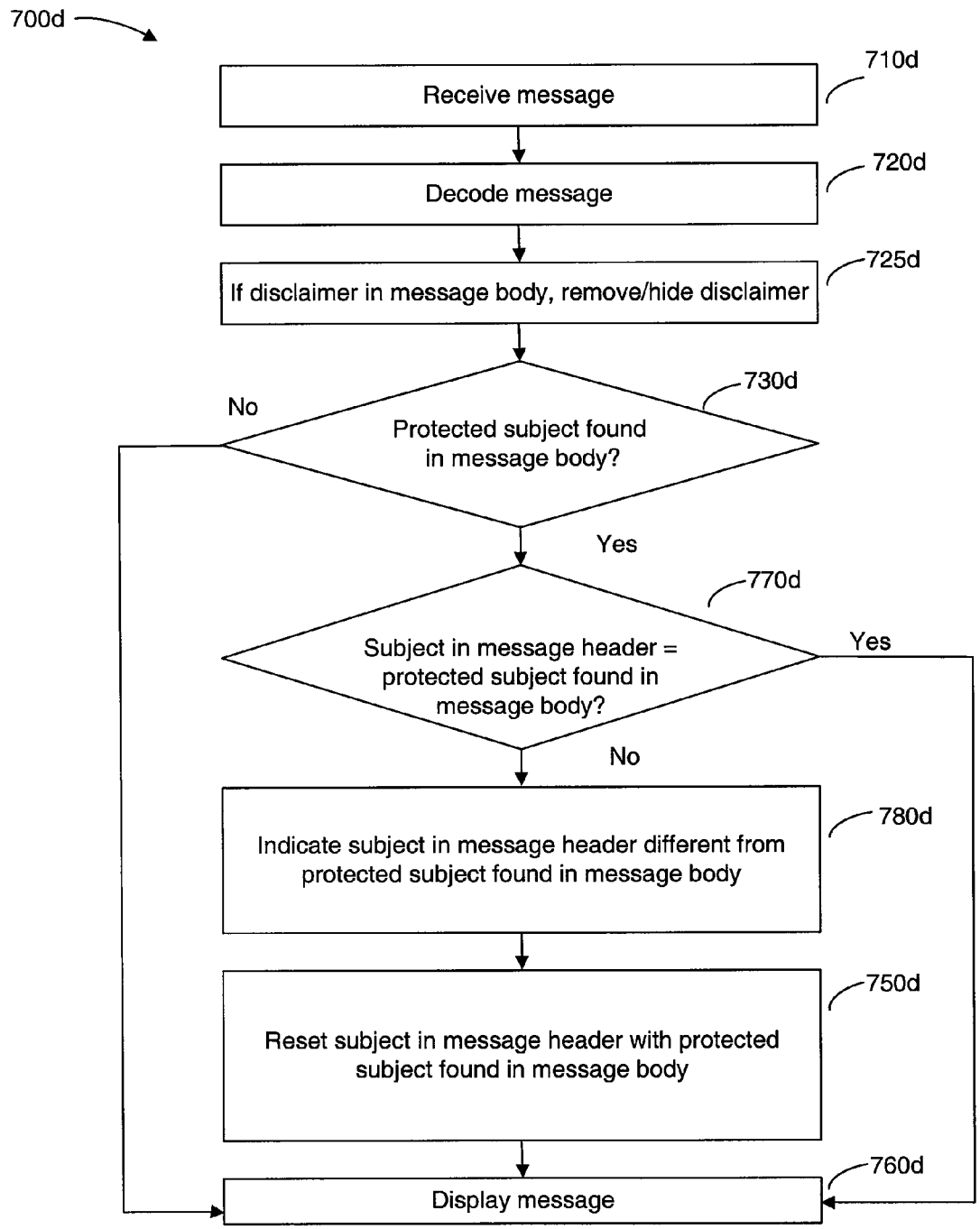

FIG. 7D is a flowchart illustrating method 700*d*, a specific variation of method 700*c* of FIG. 7C. The flowchart in FIG. 7D is similar to the flowchart in FIG. 7C except that the one or more protected header fields specifically comprise a subject field. Each act 710*d* to 780*d* is analogous to a corresponding act 710*c* to 780*c* of FIG. 7C respectively, and the reader is directed to the description of FIGS. 7A to 7C for further details.

To facilitate a better understanding of a number of features of the embodiments described herein, example messages 350 are provided in FIGS. 8A to 9B, by way of illustration only. It will be understood that the general format and content of messages 350 displayed in a user interface may differ in variant implementations.

Figure 8A:
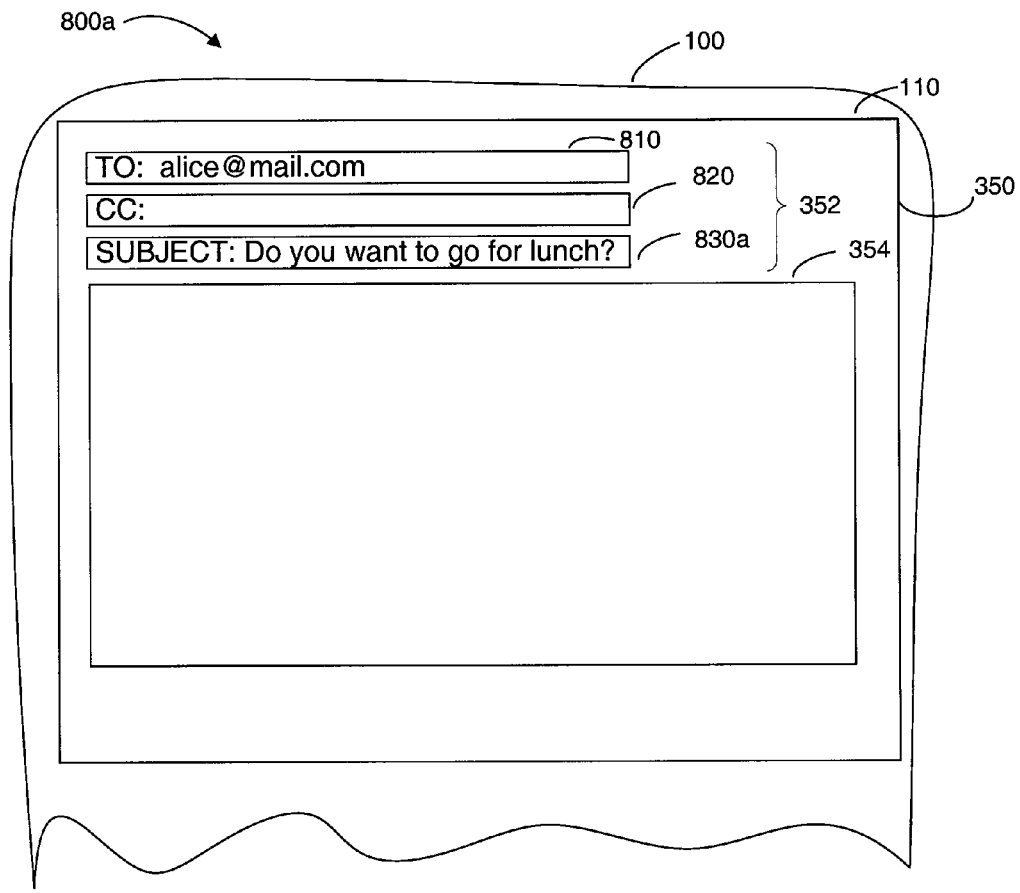
FIGS. 8A, 8B, 8C, 8D and 8E are examples of messages from the perspective of the message sender's device, the message comprising a subject field to be protected, in accordance with at least one embodiment.
Figure 8B:
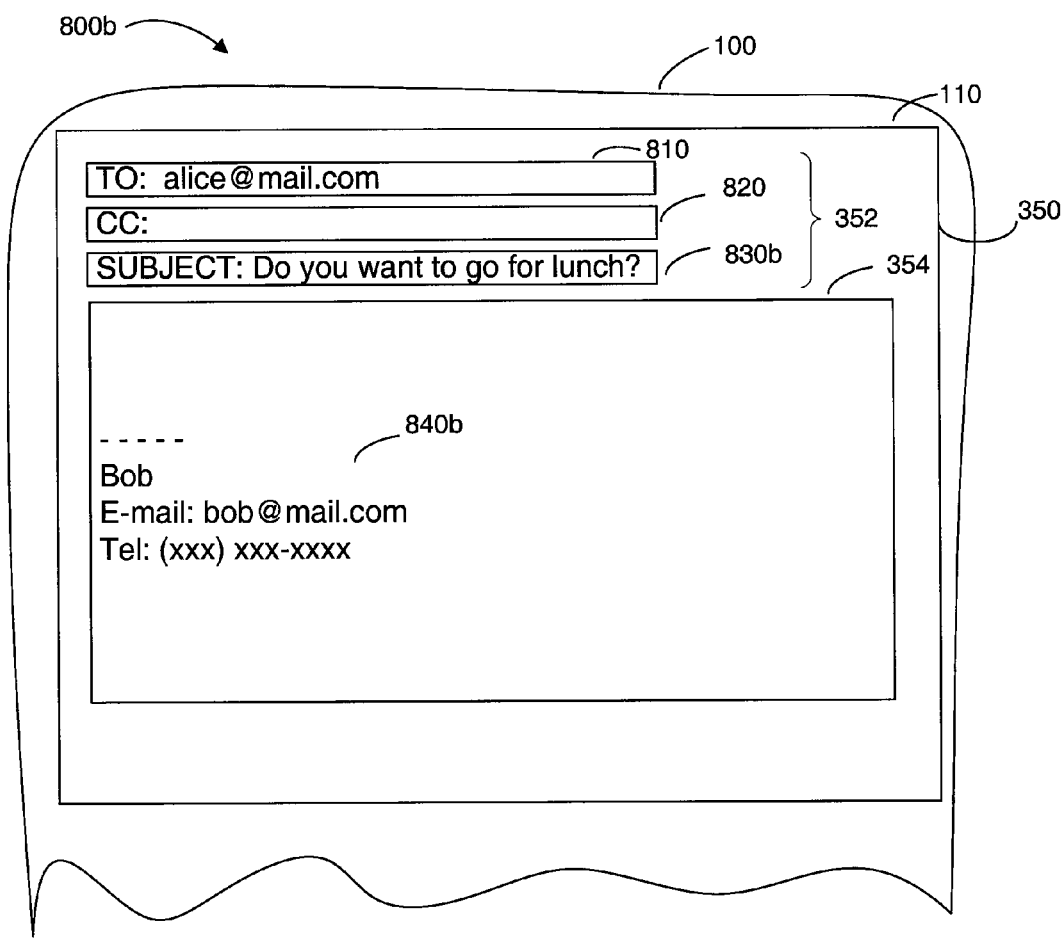

Referring first to FIGS. 8A and 8B, examples of messages 350 from the perspective of a message sender are shown generally as 800*a* and 800*b*. FIG. 8A shows an example of a message 350 with no message data in the message body 354. Where there is no message data in the message body 354, the subject field of the message 350 typically contains the entire content of the message 350. Similarly, FIG. 8B shows an example of a message 350 with no message data in the message body 354 other than a signature (or tagline) 840*b*, identifying the message sender, for example. A recipient of a message 350 that comprises only a signature (or tagline) 840*b* in the message body 354 might assume, possibly in error, that the message originates from the person identified in the signature and that the message has not been tampered with.

In these examples, a processor executing an application residing on a mobile device 100 processes the message 350 displayed in a display 110 of mobile device 100 after the user of the mobile device 100 has composed it. The message 350 may comprise some message header information 352 and, optionally, message data (not shown in FIG. 8A) in the message body 354. In these examples, the message header 352 comprises a "To" field 810, a "Cc" field 820, and a "Subject" field 830*a*. However, the message header 352 may optionally comprise additional header fields such as "Bcc", "Date", and "Reply-To", as previously described, or different header fields.

Figure 8C:
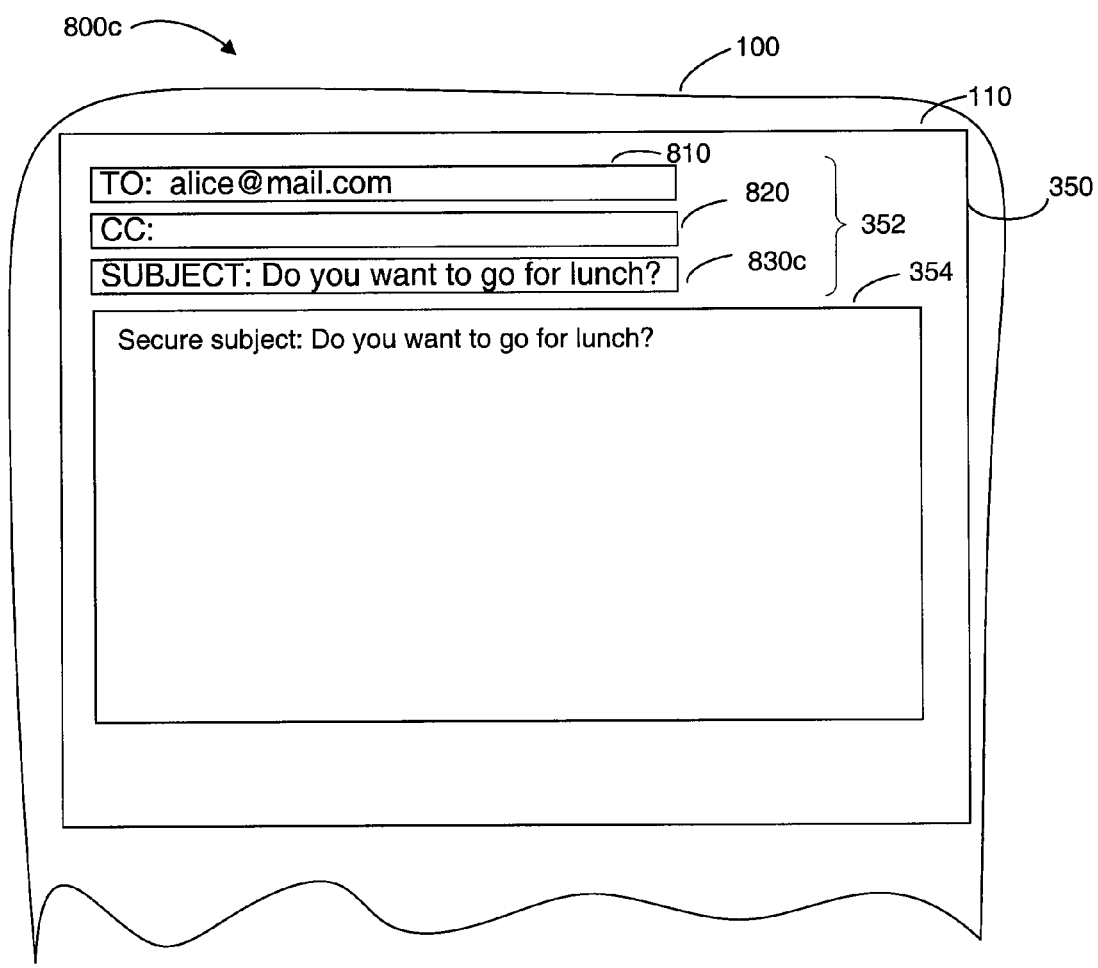
Figure 8D:
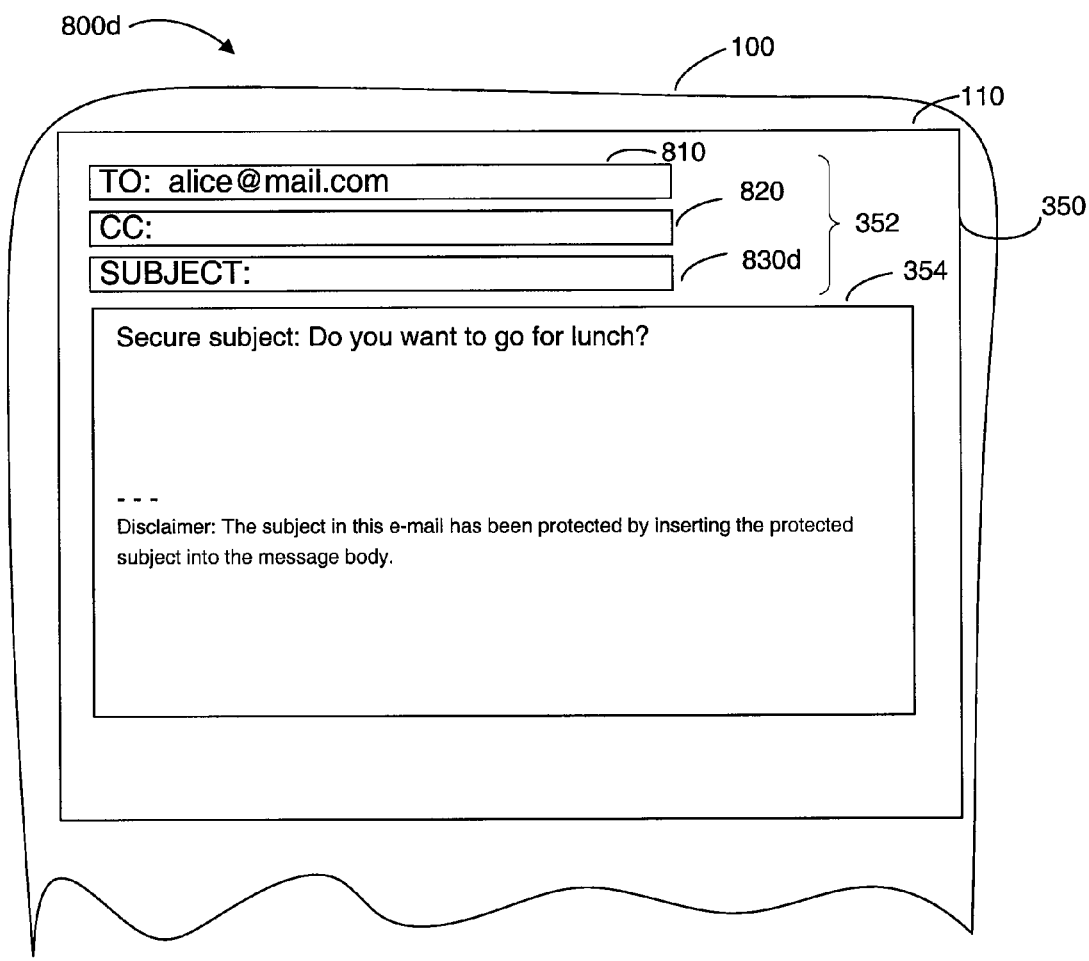
Figure 8E:
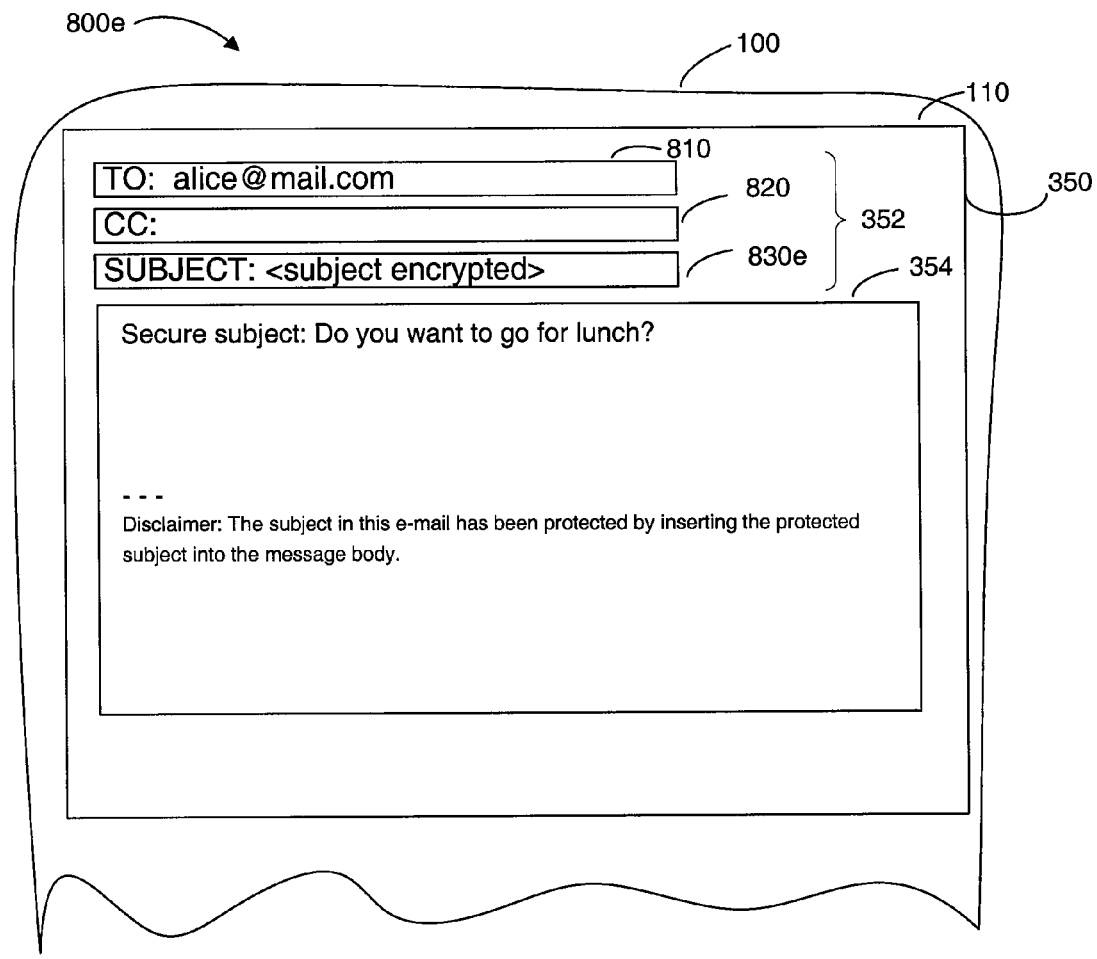

In accordance with the example embodiment described with reference to method 600*b* and FIG. 6B, it may be desired that the subject field 830*a* of the message 350 be protected (e.g. in the message illustrated in FIG. 8A). Accordingly, as illustrated in FIGS. 8C, 8D and 8E, the contents of the subject field 830*a* in the message header 352 may be inserted (see e.g. act 630*b* of method 600*b*) into the message body 354, prior to encoding (see e.g. act 660*b* of method 600*b*) and transmitting (see e.g. act 670*b* of method 600*b*) the message 350 to a message recipient. Although not shown in the examples of FIGS. 8C to 8E, persons skilled in the art will appreciate that the subject field 830*b* of the message 350 may also be protected by inserting the contents of the subject field 830*b* in the message header 352 into a message body 354 that only comprises a signature or tagline (see FIG. 8B) or into a message body 354 that contains additional and/or other message data, prior to encoding and transmitting the message 350 to a message recipient.

FIG. 8C illustrates the content of a message where the subject field 830*c* in the message header 352 is not modified (e.g. act 640*b* of method 600*b* is not performed) and a disclaimer has not been inserted into the message body 354 (e.g. act 650*b* of method 600*b* is not performed). It will be understood by persons skilled in the art that the message 350 is shown herein for illustrative purposes only, and the message sender may not see the message 350 in this processing state (i.e. the user may not see the contents of the subject field to be protected 830*c* being inserted into the message body 354).

Alternatively, FIGS. 8D and 8E illustrate the contents of message 350 subsequent to the modification of the subject field 830d and 830e (see e.g. act 640b of method 600b) and the insertion of a disclaimer in the message body 354 (see e.g. act 650b of method 600b) in variant implementations. In FIG. 8D, the original content of the subject field 830d is deleted. In FIG. 8E the original content of the subject field 830e is modified to say "<subject encrypted>" to indicate that the subject field has been protected. It will be understood by persons skilled in the art that the message 350 is shown herein for illustrative purposes only, and the message sender may not see the message 350 in this processing state (i.e. the user may not see changes made to the subject field, and/or the insertion of the disclaimer).

Figure 9A:
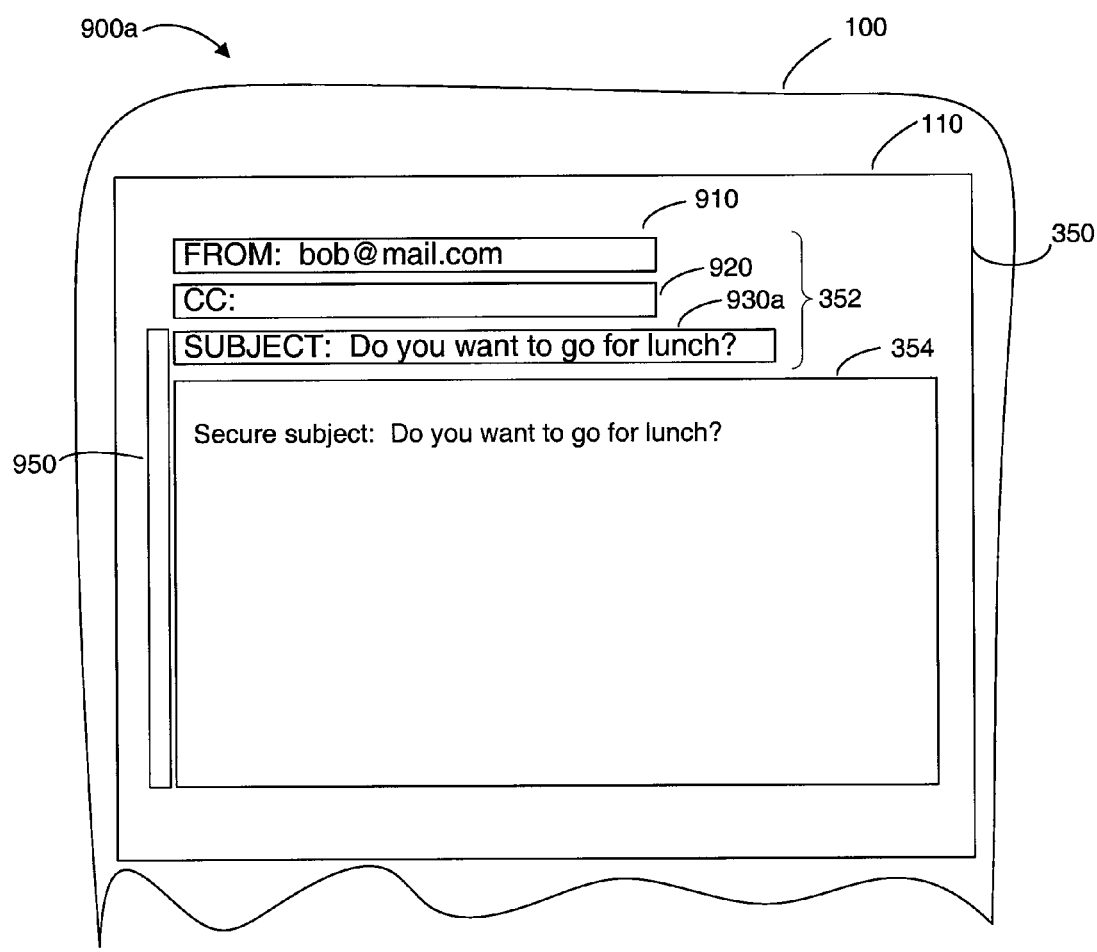
FIGS. 9A and 9B are examples of messages from the perspective of the message recipient's device, the message comprising the contents of a protected subject field inserted into the message body, in accordance with at least one embodiment.
Figure 9B:
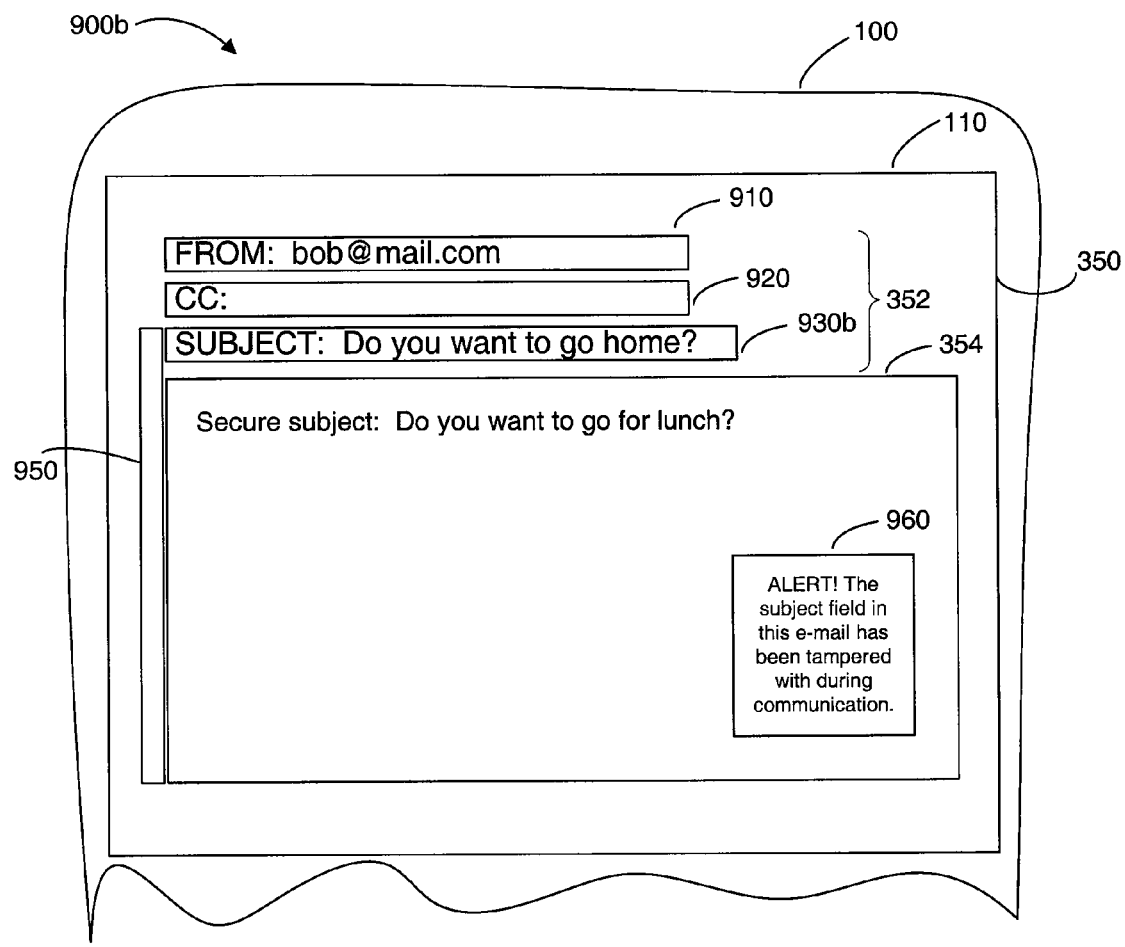

Referring next to FIGS. 9A and 9B, examples of messages 350 from the perspective of a message recipient are shown generally as 900a and 900b. In these two examples, a processor executing an application residing on a mobile device 100, for example, processes the message 350 for display in a display 110 of mobile device 100 after the user of the mobile device 100 (i.e. the message recipient) has received it from the message sender. The messages 350 each comprise a subject that has been protected and inserted into the message body 354. The portion of messages 350 include some message header information 352, and, optionally, message data (not shown in the examples of FIGS. 8A to 8E) in the message body 354. In these examples, the message header 352 comprises a "From" field 910, a "Cc" field 920, and a "Subject" field 930a and 930b. However, the message header 352 may optionally comprise additional header fields such as "Bcc", "Date", and "Reply-To", as previously described, or different header fields. In addition to displaying the message header 352 and message body 354, the display 110 may comprise a bar 950, for example, indicating that the message header 352 and the message body 354 have been protected. The bar 950 may be displayed adjacent to the one or more protected header fields in the message header to indicate which of the one or more header fields have been protected.

FIG. 9A illustrates message 350 being displayed after the performance of method 700b on the message recipient's device. Here, subject field 930a in message header 352 has been reset with the protected subject as located in the message body 354a.

FIG. 9B illustrates message 350 being displayed after the performance of method 700d on the message recipient's device, where it was determined at 770d that the protected subject field located in the message body 354 did not match the subject field 930b as provided in the message header 352 of the message as received. Accordingly, a warning message 960 is shown to the message recipient to indicate that message 350 has been tampered with.

Typically the entire content of a header field will be inserted into the message body for protection, but in a variant embodiment, only a portion of the content of a given header field may be inserted into the message body for protection.

The acts of the method of transmitting an encoded message 350 from a computing device to a message recipient, and the acts of the method of receiving an encoded message 350 from a message sender at a computing device in any of the embodiments described herein may be provided as software instructions executable by a processor (e.g. microprocessor 102 of mobile device 100) stored on computer-readable storage media.

Although electronic mail messages are usually sent comprising data in the message body, sometimes messages may be sent comprising only data in a subject field of the message header 352 and without any data in the message body 354 (i.e. an empty message body 354). In at least some example embodiments described herein, the determination as to whether the subject field in the message header 352 is to be protected at 610b of method 600b of FIG. 6B may comprise a determination as to whether the message body 354 is empty (i.e. there is no data contained therein). This may have particular advantages since when the message body 354 of a message 350 is empty, this is usually because the content of the entire message is actually contained within the subject field in the message header 352 of the message 350.

It will be understood by persons skilled in the art that in the case of signed only messages (i.e. the message is not encrypted), the content of the one or more protected header fields may be extracted from the message body (e.g. to be shown in a message list or to reset the one or more protected header fields) without the message data in the message body 354 having to be first decrypted.

In variant embodiments, the contents of the one or more protected header fields extracted from the message body may be stored in a memory (e.g. a non-volatile memory) of the computing device. It may be desirable to store the contents of the one or more protected header fields extracted from the message body 354 when the message body 354 is decrypted, independent of the message 350, especially where the message body 354 may be subsequently re-encrypted for storage on the computing device.

Some computing devices may offer content protection capabilities. Generally, content protection provides for the automatic encryption of data that is stored on the computing device upon locking of the device, so that an attacker cannot access the data. This functionality may be particularly useful for securing potentially sensitive or personal data, including e-mail messages and addresses, calendar data, accessed web content and browser histories, and note or task data, for example. If content protection is enabled, then such data, when stored on the computing device, may be encrypted with a content protection key when the computing device is locked. In a variant embodiment, on a content protected computing device, the contents of one or more protected header fields may be extracted from the message body and stored along with the message (while not encrypted with the encryption key which typically protects that message body) so that the contents of the one or more protected header fields are always available when the computing device is unlocked (the content protection key provides security for the data when the computing device is locked), even if the body of the message is subsequently re-encrypted for storage on the computing device in encrypted form.

As used herein, the wording "and/or" is intended to represent an inclusive-or. That is, "X and/or Y" is intended to mean X or Y or both. Moreover, "X, Y, and/or Z" is intended to mean X or Y or Z or any combination thereof.

A number of embodiments have been described herein. However, it will be understood by persons skilled in the art that other variants and modifications may be made without departing from the scope of the claimed embodiments appended hereto.

The invention claimed is:

1. A method of transmitting an encoded message from a computing device to a message recipient device, the message comprising a message header and a message body, the message header comprising a plurality of header fields, the method comprising:

the computing device inserting original content of one or more header fields to be protected into the message body prior to transmission of the message to the message recipient device;

modifying the one or more header fields to be protected to include, instead of the original content, one or more respective text notices that indicate that the original content is protected, thereby generating a modified message header;

encoding the message body which includes the original content of the one or more header fields to be protected; and after encoding the message body, transmitting the message comprising the modified message header and the encoded message body to the message recipient device, such that when the message is received and processed by the message recipient device, the processing including decoding of the encoded message body, the original content of the one or more header fields to be protected is extracted from the decoded message body and inserted back into the one or more header fields of the message header, and when the message is displayed in a user interface of the message recipient device, the user interface is displayed with indicia indicating that the one or more header fields to be protected in the message header have been protected.

2. The method of claim 1, further comprising:

determining, prior to inserting the original content into the message body, which of the plurality of header fields are to be protected.

3. The method of claim 2, wherein the determining is performed based on a configuration setting.

4. The method of claim 3, wherein, the configuration setting is provided in an information technology (IT) policy.

5. The method of claim 2, wherein the determining comprises receiving input, via a user interface of the computing device, that identifies the one or more header fields to be protected of the plurality of header fields.

6. The method of claim 5, wherein the message is composed at the computing device, and the input is received prior to composition of the message.

7. The method of claim 5, wherein the input is received upon installation of an application at the computing device that is configured for transmitting the message.

8. The method of claim 5, wherein the input is received upon a powering on of the computing device.

9. The method of claim 1, wherein the computing device comprises a mobile device.

10. The method of claim 1, wherein the one or more header fields to be protected comprises a subject field.

11. A non-transitory computer-readable medium storing instructions, which when executed by a processor, cause the processor to transmit an encoded message from a computing device to a message recipient device, the message comprising a message header and a message body, the message header comprising a plurality of header fields, and cause the processor to:

insert original content of one or more header fields to be protected into the message body prior to transmission of the message to the message recipient device;

modify the one or more header fields to be protected to include, instead of the original content, one or more respective text notices that indicate that the original content is protected, thereby generating a modified message header;

encode the message body which includes the original content of the one or more header fields to be protected; and after encoding the message body, transmit the message comprising the modified message header and the encoded message body to the message recipient device, such that when the message is received and processed by the message recipient device, the processing including decoding of the encoded message body, the original content of the one or more header fields to be protected is extracted from the decoded message body and inserted back into the one or more header fields of the message header, and when the message is displayed in a user interface of the message recipient device, the user interface is displayed with indicia indicating that the one or more header fields to be protected in the message header have been protected.

12. A computing device comprising a processor and a memory storing instructions for transmitting an encoded message from the computing device to a message recipient device, the message comprising a message header and a message body, the message header comprising a plurality of header fields, wherein when the instructions are executed by the processor, the processor is configured to:

insert original content of one or more header fields to be protected into the message body prior to transmission of the message to the message recipient device;

modify the one or more header fields to be protected to include, instead of the original content, one or more respective text notices that indicate that the original content is protected, thereby generating a modified message header;

encode the message body which includes the original content of the one or more header fields to be protected; and after encoding the message body, transmit the message comprising the modified message header and the encoded message body to the message recipient device, such that when the message is received and processed by the message recipient device, the processing including decoding of the encoded message body, the original content of the one or more header fields to be protected is extracted from the decoded message body and inserted back into the one or more header fields of the message header, and when the message is displayed in a user interface of the message recipient device, the user interface is displayed with indicia indicating that the one or more header fields to be protected in the message header have been protected.

13. The computing device of claim 12, wherein the processor is further configured to:

determine, prior to inserting the original content into the message body, which of the plurality of header fields are to be protected.

14. The computing device of claim 13, wherein the determining is performed based on a configuration setting.

15. The computing device of claim 14, wherein, the configuration setting is provided in an information technology (IT) policy.

16. The computing device of claim 13, wherein to determine which of the plurality of header fields are to be protected, the processor is further configured to receive input, via a user interface of the computing device, that identifies the one or more header fields to be protected of the plurality of header fields.

17. The computing device of claim 16, wherein the message is composed at the computing device, and the input is received prior to composition of the message.

18. The computing device of claim 16, wherein the input is received upon installation of an application at the computing device that is configured for transmitting the message.

19. The computing device of claim 16, wherein the input is received upon a powering on of the computing device.

20. The computing device of claim 12, wherein the computing device comprises a mobile device.

21. The computing device of claim 12, wherein the one or more header fields to be protected comprises a subject field.

* * * * *